United States Patent [19]

Harada et al.

[11] Patent Number: 5,754,686
[45] Date of Patent: May 19, 1998

[54] METHOD OF REGISTERING A CHARACTER PATTERN INTO A USER DICTIONARY AND A CHARACTER RECOGNITION APPARATUS HAVING THE USER DICTIONARY

[75] Inventors: Takashi Harada, Yokohama; Katsuhiko Sakaguchi, Kawasaki; Shigeki Mori, Koshigaya; Kazuhiro Matsubayashi, Yokohama; Tsunekazu Arai, Tama; Eiji Takasu, Yokohama; Hiroto Yoshii, Tokyo, all of Japan

[73] Assignee: Canon Kabushiki Kaisha, Tokyo, Japan

[21] Appl. No.: 385,469

[22] Filed: Feb. 8, 1995

[30] Foreign Application Priority Data

Feb. 10, 1994 [JP] Japan ............................ 6-016247

[51] Int. Cl.[6] ................................................ G06K 9/00
[52] U.S. Cl. ........................... 382/187; 382/185; 382/186
[58] Field of Search ................................ 382/200, 198, 382/189, 188, 187, 186, 185, 182, 161, 159

[56] References Cited

U.S. PATENT DOCUMENTS

| | | | |
|---|---|---|---|
| 5,121,441 | 6/1992 | Chefalas | 382/161 |
| 5,191,622 | 3/1993 | Shojima | 382/185 |
| 5,222,160 | 6/1993 | Sakai | 382/185 |
| 5,287,415 | 2/1994 | Chefalas | 382/187 |
| 5,315,667 | 5/1994 | Fujisaki | 382/187 |
| 5,319,721 | 6/1994 | Chefalas | 382/161 |
| 5,434,929 | 7/1995 | Beernink | 382/187 |
| 5,479,531 | 12/1995 | Webster | 382/187 |
| 5,533,141 | 7/1996 | Futatsugi | 382/188 |
| 5,550,930 | 8/1996 | Berman | 382/187 |
| 5,680,480 | 10/1997 | Beernink | 382/187 |

FOREIGN PATENT DOCUMENTS

| | | |
|---|---|---|
| 58-144980 | 8/1983 | Japan . |
| 62-249294 | 10/1987 | Japan . |

*Primary Examiner*—Dwayne Bost
*Assistant Examiner*—Brian L. Johnson
*Attorney, Agent, or Firm*—Fitzpatrick, Cella, Harper & Scinto

[57] ABSTRACT

In the present invention, an input handwritten character pattern is subjected to character recognition processing, and a recognition reliability of the character as a standard characteristic feature pattern is determined from the recognition result. If the recognition reliability is low, a warning is issued. In response to the warning, a user or operator can decide whether the character pattern should be registered in the user dictionary (106). If it is decided that the character pattern should be registered in the user dictionary, the character pattern is stored in the user dictionary with the information representing that the character pattern has low recognition reliability. When character patterns registered in the user dictionary are displayed on a screen, these characters are displayed in such a manner that it is possible to distinguish characters having low recognition reliability from characters having high recognition reliability. There is also provided a user name index file (5309) for storing information regarding characteristic features of a handwritten character pattern peculiar to a specific user. Furthermore, there is also provided a password input-and-decision part (5103) for making a decision of whether or not allow to access to the user dictionary based on the information of the handwritten character pattern input by a specific user.

10 Claims, 47 Drawing Sheets

| き,ぉ, | い, | か, | う, | ざ, | き,ぉ, | す, |
|---|---|---|---|---|---|---|
| あ,ぉ, | う, | い, | s, | あ, | う, | あ, |
| き,ぉ, | い, | g, | あ, | き, | あ, | あ, |
| き,ぉ, | い, | ず, | n, | z, | n, | う, |

FIG. 24

| DISPLAY NO. | STORAGE NO. | CHARACTER CODE | COERCIVE REGISTRATION FIELD |
|---|---|---|---|
| 1 | 6 | 0x2422 | 1 |
| 2 | 2 | 0x2526 | 0 |
| 3 | 3 | 0x3544 | 0 |
| 4 | 5 | 0x3962 | 0 |
| 5 | 1 | 0x3f37 | 1 |
| 6 | 4 | 0x5f37 | 0 |

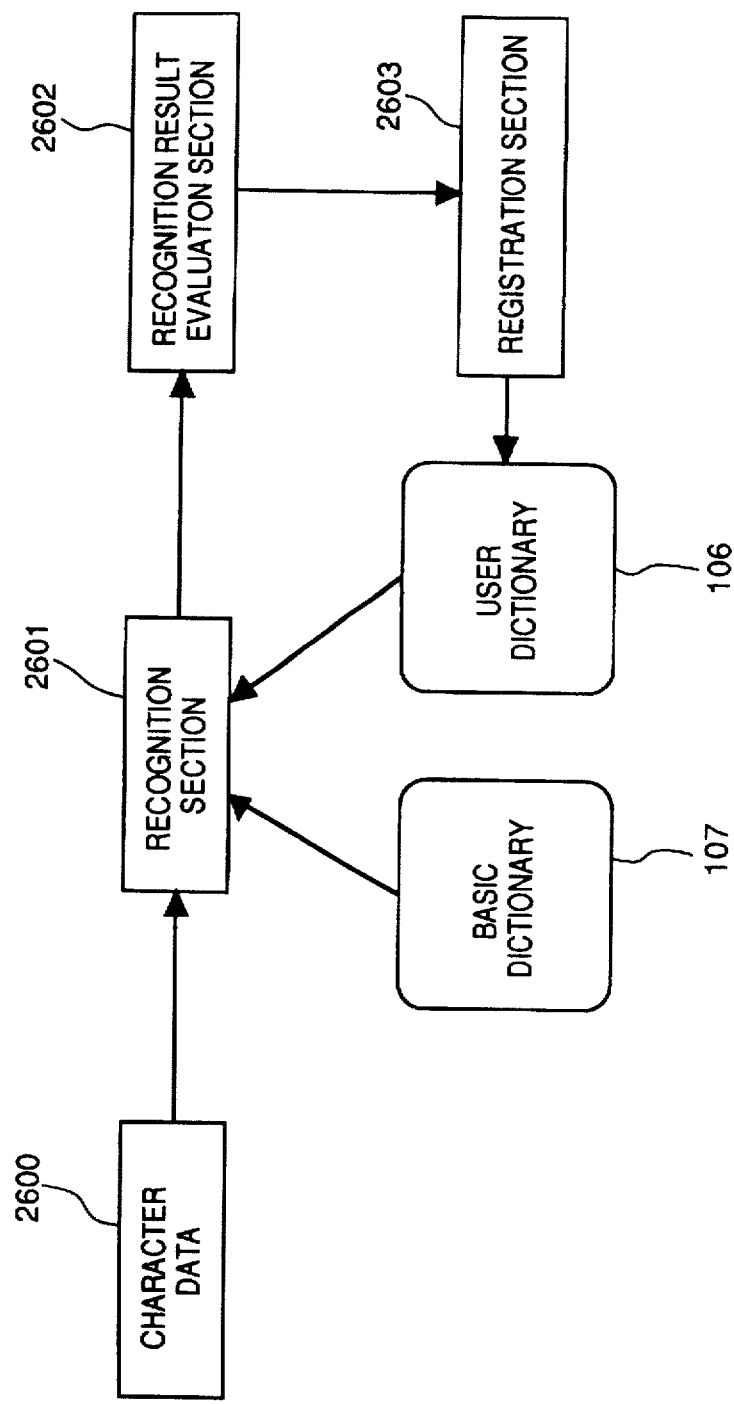

FIG. 27

| | THE MOST PROBABLE CANDIDATE JUDGING FROM THE RECOGNITION RESULT IS | DIFFERENCE LEVEL OF THE MOST PROBABLE CANDIDATE IS |
|---|---|---|
| ① | "職" (SHOKU) | LESS THAN A THRESHOLD VALUE (THE RESULT IS RELIABLE) |
| ② | "職" (SHOKU) | GREATER THAN A THRESHOLD VALUE (THE RESULT IS UNRELIABLE) |
| ③ | NOT "職" (SHOKU) | LESS THAN A THRESHOLD VALUE (THE RESULT IS RELIABLE) |
| ④ | NOT "職" (SHOKU) | GREATER THAN A THRESHOLD VALUE (THE RESULT IS UNRELIABLE) |

FIG. 28

USER REGISTRATION

WARNING!

YOU ARE TRYING TO REGISTER A CHARACTER PATTERN CORRESPONDING TO "蝕" (SHOKU).
HOWEVER, THERE IS A HIGH PROBABILITY THAT YOUR CHARACTER PATTERN IS RECOGNIZED INCORRECTLY.
DO YOU WANT TO REGISTER YOUR CHARACER PATTERN?

YES    NO

5801 : TO NEW CHARACTER REGISTRATION ROUTINE

| DISPLAY NO. | STORAGE NO. | CHARACTER CODE |
|---|---|---|
| 1 | 6 | 0x2422 |
| 2 | 2 | 0x2526 |
| 3 | 3 | 0x3544 |
| 4 | 5 | 0x3962 |
| 5 | 1 | 0x3f37 |
| 6 | 4 | 0x5f37 |

METHOD OF REGISTERING A CHARACTER PATTERN INTO A USER DICTIONARY AND A CHARACTER RECOGNITION APPARATUS HAVING THE USER DICTIONARY

BACKGROUND OF THE INVENTION

1. Field of the Invention

The present invention relates to a character recognition apparatus. More specifically, the present invention relates to a method of registering a character pattern in a user dictionary, and to a character recognition apparatus having such a user dictionary.

2. Description of the Related Art

In conventional techniques, when a character pattern is registered in a user dictionary, retrieval is performed to check whether a character pattern very similar to a handwritten character pattern to be registered has already been registered in a basic dictionary or other registered dictionaries. If such a character pattern is found in a dictionary, a warning is displayed. If the user still indicates his/her intention of registration in spite of the warning, then the registration will be accepted.

Conventionally, furthermore, a separate user dictionary for each user can be created and edited so that the same character recognition apparatus can be used by a plural users.

However, coercive registration such as that described above may produce a trouble in the processing of character recognition. In such a case, the user dictionary has to be re-edited. In the re-edition of registered characters, a list of the registered characters (printing character patterns corresponding to the registered handwritten character patterns) is displayed so that a user can select the character to be deleted or modified from the list. However, no indication will be given as to which character should be re-edited.

Furthermore, in the case where the same character recognition apparatus is used by a plurality of users, there is a possibility that a user dictionary is accessed and modified intentionally or unintentionally by an unauthorized user without permission of the authorized user.

SUMMARY OF THE INVENTION

In view of the above, it is an object of the present invention to provide a method of registering a character pattern in a user dictionary and a character recognition apparatus having a user dictionary in which when a user issues a request of registering a specific character pattern, the reliability of the character pattern is evaluated, and the information of the evaluated result is stored in the user dictionary so that re-edition of registered character patterns can be performed properly and easily.

It is another object of the present invention to provide a method of registering a character pattern in a user dictionary and a character recognition apparatus having a user dictionary in which an unauthorized user cannot modify the user dictionary without permission of an authorized user.

According to a first aspect of the present invention to achieve the above objects, there is provided a character recognition apparatus that inputs a character pattern and recognizes the input character pattern, the character recognition apparatus comprising: input means for inputting a character pattern; warning issuing means for recognizing the input character pattern, estimating recognition reliability of the input character pattern from the above recognition result and for issuing warning if the recognition reliability is less than a predetermined threshold value, the recognition reliability representing a probability that a character pattern is repeatedly recognized, without being misidentified as any other characters after the input character pattern has been registered; indicating means for indicating whether or not the input character pattern that has received the above warning should be registered in a user dictionary; registration means for registering the input character pattern together with information indicating that the input character pattern has low recognition reliability if the indicating means has indicated that the input character pattern should be registered in the user dictionary; and display means for displaying a character pattern registered in the user dictionary in such a manner that it is possible to distinguish whether the displayed character pattern has high or low recognition reliability.

Based on the above first aspect of the present invention, there is provided a character recognition apparatus in which the recognition reliability is estimated according to information including information of a handwritten character pattern.

Based on the first aspect of the present invention, there is provided a character recognition apparatus in which the above-described display means displays characters in such a manner that it is possible to distinguish a character with high recognition reliability from a character with low recognition reliability by means of at least one of reverse techniques, color difference, shade difference, display density difference, and outline difference.

Based on the first aspect of the present invention, there is provided a character recognition apparatus in which the above-described display means displays characters in such a manner that characters with low recognition reliability are displayed in a display area different from a display area in which characters with high recognition reliability are displayed.

According to a second aspect of the present invention, there is provided a method of registering a character pattern in a user dictionary in a character recognition apparatus for inputting a character pattern and recognizing the input character pattern, the method comprising the steps of: recognizing the input character pattern; estimating recognition reliability of the input character pattern from the recognition result after if the input character pattern is registered, the recognition reliability representing a probability that a character pattern is recognized repeatedly without being misidentified as any of other characters; issuing a warning if the recognition reliability is less than a predetermined threshold value; and registering the input character pattern in the user dictionary together with information representing that the input character pattern has low recognition reliability in the case where it is requested that the input character which has received the above-described warning be registered in the user dictionary.

Based on the above second aspect of the present invention, there is provided a method in which the recognition reliability is estimated according to information including of regarding a handwritten character pattern.

According to a third aspect of the present invention, there is provided a character recognition apparatus that inputs a character pattern and recognizes the character pattern, the character recognition apparatus comprising: coordinate input means for inputting a handwritten character pattern; user dictionary means for storing character information peculiar to a specific user; handwritten character pattern registration means for registering information of a handwritten character pattern peculiar to the specific user input via the coordinate input means; access allowing means for determining whether or not the user is allowed to access a user dictionary based on the information of the input handwritten character pattern peculiar to the specific user; and user-dictionary edit means for editing the user dictionary allowed to be accessed.

According to a forth aspect based on the third aspect of the present invention, there is provided a character recognition apparatus in which the access allowing means includes: comparison means for extracting characteristic features of an input handwritten character pattern and comparing the extracted characteristic features with the characteristic features of a handwritten character pattern input as a password in a new user registration process; and decision means for making a decision whether or not the access to the user dictionary is allowed based on the result of the above comparison.

Based on the third or forth aspect of the present invention, there is provided a character recognition apparatus wherein the above-described access allowing means includes measurement means for measuring time at which each characteristic feature is extracted, the above measurement being performed when a password is registered in a new user registration process and also at the beginning of an editing process of a user dictionary, and wherein the decision of whether the access to the user dictionary should be permitted is made based on the value measured by the measurement means.

In the character recognition apparatus for inputting a character pattern and recognizing the input character pattern, that is constructed in the above-described manner according to the present invention, it is possible to eliminate or reduce improper operations during rewriting of a user dictionary.

In the method of registering a character pattern in a user dictionary according to the present invention, and also in the character recognition apparatus having such a user dictionary according to the present invention, when a user registers a specific handwritten character pattern, the recognition reliability of the character pattern is estimated and the estimated information is stored in the user dictionary so that when the user dictionary is edited later, the editing operation can be performed properly and easily.

Thus, in the method of registering a character pattern into a user dictionary according to the present invention, and also in the character recognition apparatus having a user dictionary according to the present invention, it is ensured that an unauthorized user cannot modify the user dictionary without permission of an authorized user.

Furthermore, in the present invention, when a character pattern is registered in a user dictionary, if the character pattern has low recognition reliability, the character pattern is registered together with the information representing that the character pattern has low recognition reliability. When the character pattern is displayed, the information indicating that the character has low recognition reliability is also displayed thereby reducing the possibility of erroneous operations.

Furthermore, when a user or operator wants to access a user dictionary, the user is requested to input a handwritten character pattern. If the input handwritten character pattern is consistent with the handwritten character pattern that was registered beforehand, the access to the user dictionary is permitted. This prevents the user dictionary from being accessed and modified intentionally or unintentionally by an unauthorized user.

Additional objects and features of the invention will be more readily apparent from the following detailed description when taken in conjunction with the accompanying drawings.

BRIEF DESCRIPTION OF THE DRAWINGS

FIG. 20 is a diagram showing a new character registration screen;

FIG. 23 is a schematic diagram showing a disk file;

FIG. 24 is a schematic diagram showing a character code correspondence table;

FIG. 26 is a diagram showing a procedure of registering character data into a user dictionary;

FIG. 27 is a diagram showing an example of the reliability decision table;

FIG. 28 is a diagram showing a warning message screen;

FIG. 55 is a diagram showing a new character registration screen;

FIG. 59 is a diagram showing a character code correspondence table;

DESCRIPTION OF THE PREFERRED EMBODIMENTS

First Embodiment

Referring to the accompanying drawings, preferred embodiments according to the present invention will be described in detail below.

An Example of the Construction a Character Recognition Apparatus

Figure 1:
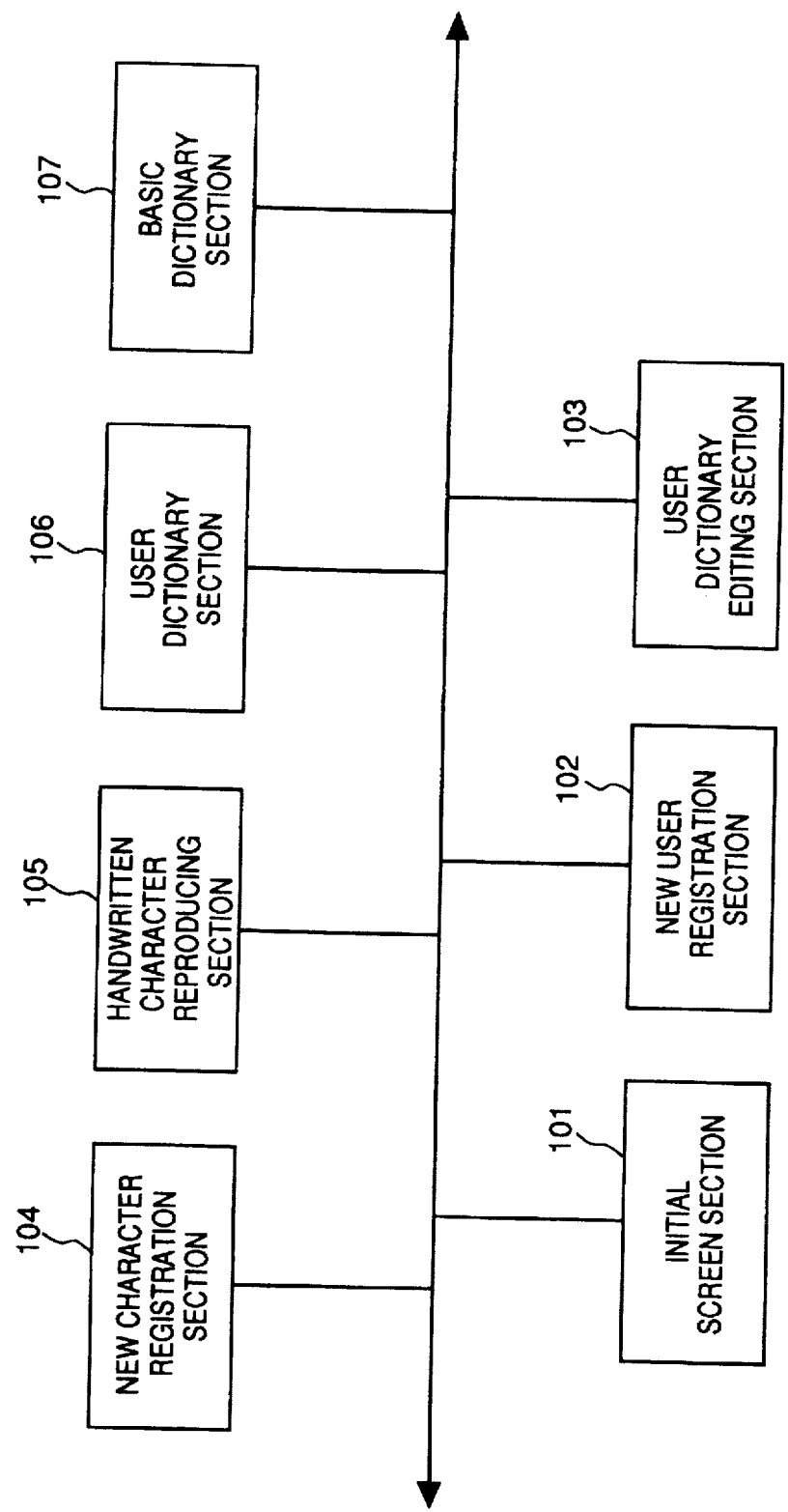
FIG. 1 is a block diagram showing a construction of a character recognition apparatus of the first embodiment.

FIG. 1 is a block diagram illustrating a user character pattern registration application program for use in the present invention.

In this FIG. 1, blocks 101–106 represent functional elements relating to user character registration performed by means of on-line character recognition processing. These blocks include window application sections by means of a GUI (graphical user interface) and user dictionaries.

In the initial screen section 101, a list of authorized users or owners of dictionaries is displayed. Furthermore, this initial screen section 101 also includes button commands for calling a section for registering a new user and a section for editing a character registered in a user dictionary. As described above, the registration of a new user is executed in the new user registration section 102. In a user dictionary editing section 103, a list of characters registered in a user dictionary is displayed so that selected characters can be deleted and handwritten character patterns are displayed. Furthermore, this section also includes the capability of calling a section for registering a new handwritten character pattern given by a user. This character registration is performed in a new character registration section 104 when it is called by the user dictionary editing section 103. In a handwritten character reproducing section 105, a handwritten character pattern of a character selected in the user dictionary editing section 103 is displayed according to the stored handwritten character data. The user dictionary section 106 store information of registered characters for use in the above-described functions. The user dictionary section 106 include a plurality of user dictionaries owned by different users. The basic dictionary 107 is a standard dictionary provided in the apparatus and used generally in character recognition.

Figure 25:
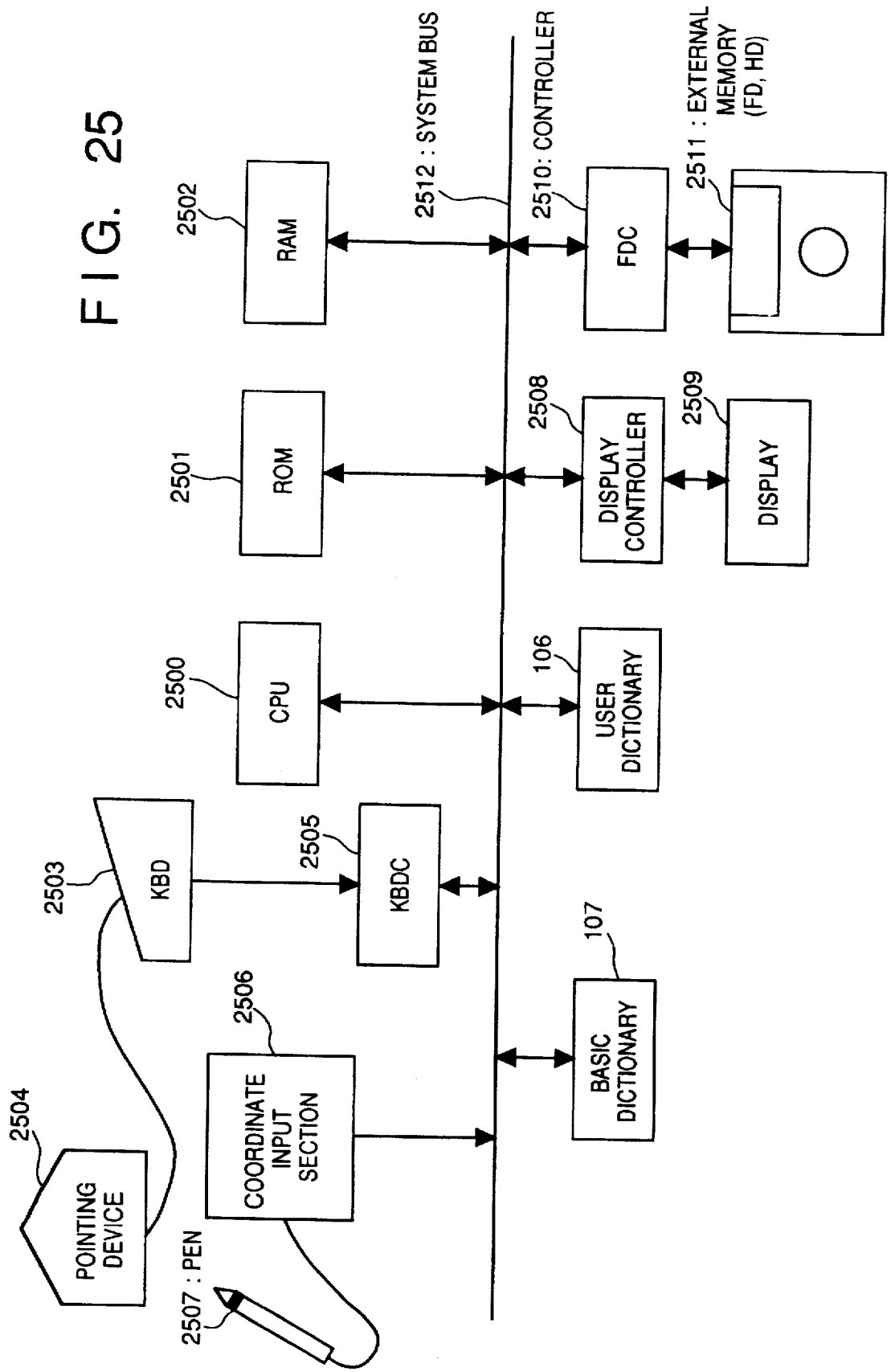
FIG. 25 is a block diagram showing a hardware for use in a character recognition apparatus of the first embodiment.

FIG. 25 is a block diagram illustrating the general construction of the character recognition apparatus according to the present embodiment of the invention.

In FIG. 25, reference numeral 2500 denotes a CPU for controlling the entire apparatus according to a control program and data stored in a ROM 2501, reference numeral 2501 denotes the ROM for storing the program executed by the CPU 2500 as will be described in more detail later, and reference numeral 2502 denotes a RAM used as a work area for the CPU 2500 and also used to store an input character pattern. Reference numeral 2503 denotes a keyboard, 2504 denotes a pointing device used to input coordinate data designating a location on the display screen, and 2505 denotes a controller for controlling the keyboard 2503 and the pointing device 2504. Reference numeral 2506 denotes a coordinate input section such as a digitizer for inputting coordinate data with respect to a character written on the coordinate input section 2506 with an input pen 2507.

Reference numeral 2508 denotes a display controller for controlling a display, and 2509 denotes the display such as a CRT or a liquid crystal display. Reference numeral 2510 denotes a controller for controlling the interface with a floppy disk or a hard disk, and 2511 denotes an external memory such as a floppy disk or a hard disk. The above-described basic dictionary section 107 and the user dictionary section 106 are stored in this external memory 2511. These dictionaries may be read into a dictionary memory and accessed as required. Reference numeral 2512 denotes a system bus for connecting the above-described elements to each other.

The Operation of the Character Recognition Apparatus

Figure 2:
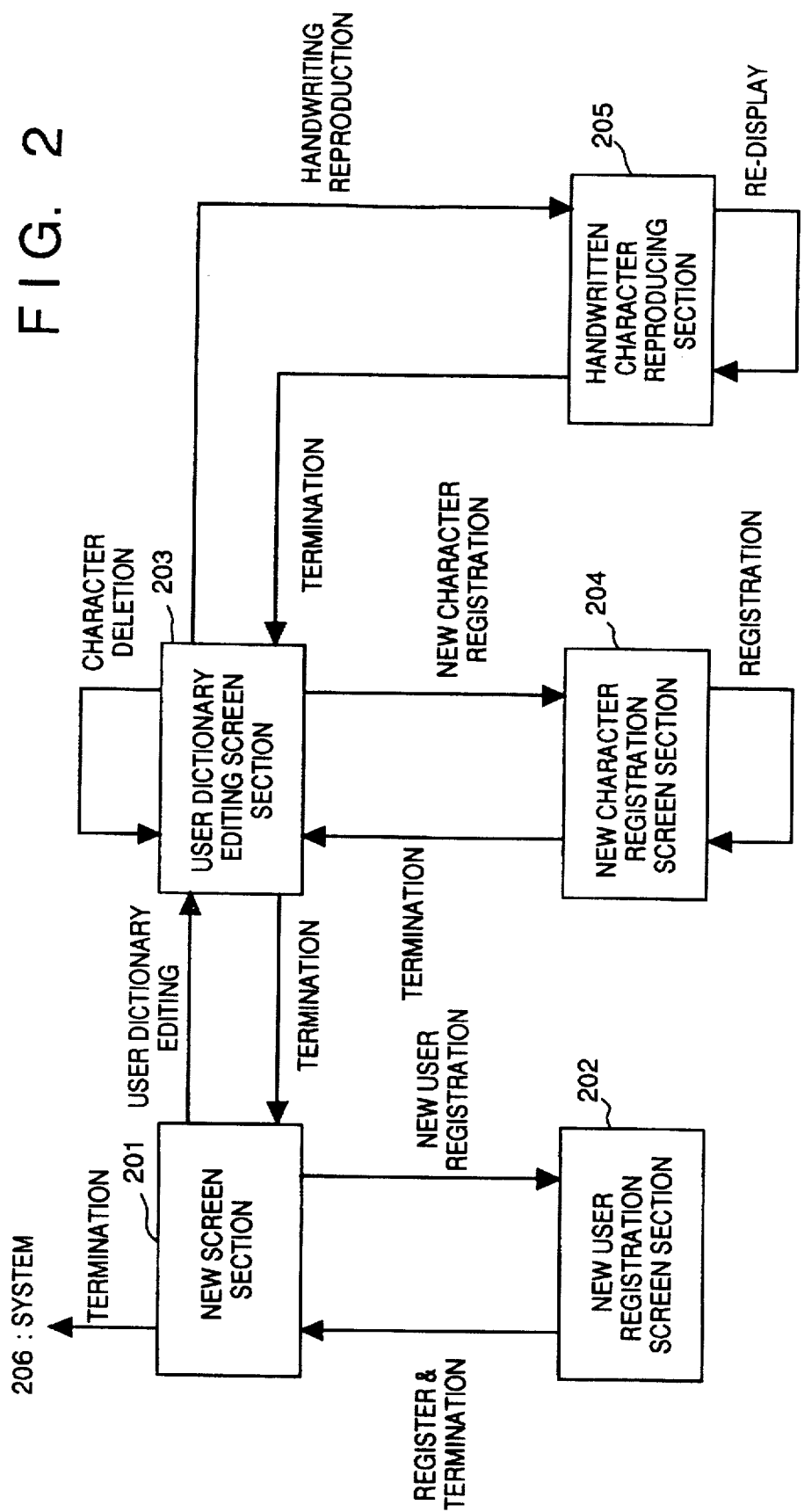
FIG. 2 is a window condition transition chart regarding the character recognition apparatus of the first embodiment.

FIG. 2 is a window condition transition chart associated with the user character pattern registration application program.

Each block 201-205 represents a screen for executing the above-described sections. When the user character pattern registration application program is completed, the control returns to the system 206. In FIG. 2, arrows represent the flows of control commands executed via control buttons provided in respective windows. The flows and the window transitions will be described below.

In the new screen section 201, if the "new user registration" command is selected, a new user registration screen section 202 in the form of a pop-up window appears. In the new user registration screen section 202, if the "register and termination" command is selected, then this pop-up window is closed and the control is returned to the new screen section 201 again.

In the screen section 201, if the "user dictionary edit" command is selected, the screen section 201 is closed and the user dictionary editing screen section 203 appears. In this state, if the "new character registration" command is selected, a new character registration screen section 204 in the form of a pop-up window appears. In this window, characters can be registered one after another unless the "termination" command is selected. After the registration of a character is completed, if the "termination" command is selected, the new character registration screen 204 is closed and the control returns to the user dictionary editing screen 203. Similarly, the "character deletion" command can also be executed a plurality of times in the user dictionary editing screen 203.

In the user dictionary editing screen 203, if the "handwritten reproduction" command is selected, the handwritten character reproducing screen 205 in the form of a pop-up window appears. When the window appears, the reproduction of a handwritten character is immediately started. The reproduction of the handwritten character can be performed repeatedly by selecting the "re-display" command. If the "termination" command is selected, the handwritten character reproducing screen is closed and the control returns to the user dictionary editing screen.

In the user dictionary editing screen 203, if the "termination" command is selected, the user dictionary editing screen is closed and the starting window 201 is displayed again. Thus, if the "exit" command is selected in the new screen section 201, the control exits from the user character pattern registration application program, wherein this is the only way to exit from the user character pattern registration application program.

As can be seen from the above description, the number of windows associated with the user character pattern registration application program is two when the pop-up window of screen 202, 204, or 205 is displayed, and one when the window of screen 201 or 203 is displayed.

The Operation Procedure of the Character Recognition Apparatus

The operations and related flows in the respective screens will be described in more detail referring to FIGS. 3–16.

Initial Screen Section

First, the process flow relating to the Initial screen will be described referring to FIG. 17 as well as the flowchart in FIG. 3.

Figure 17:
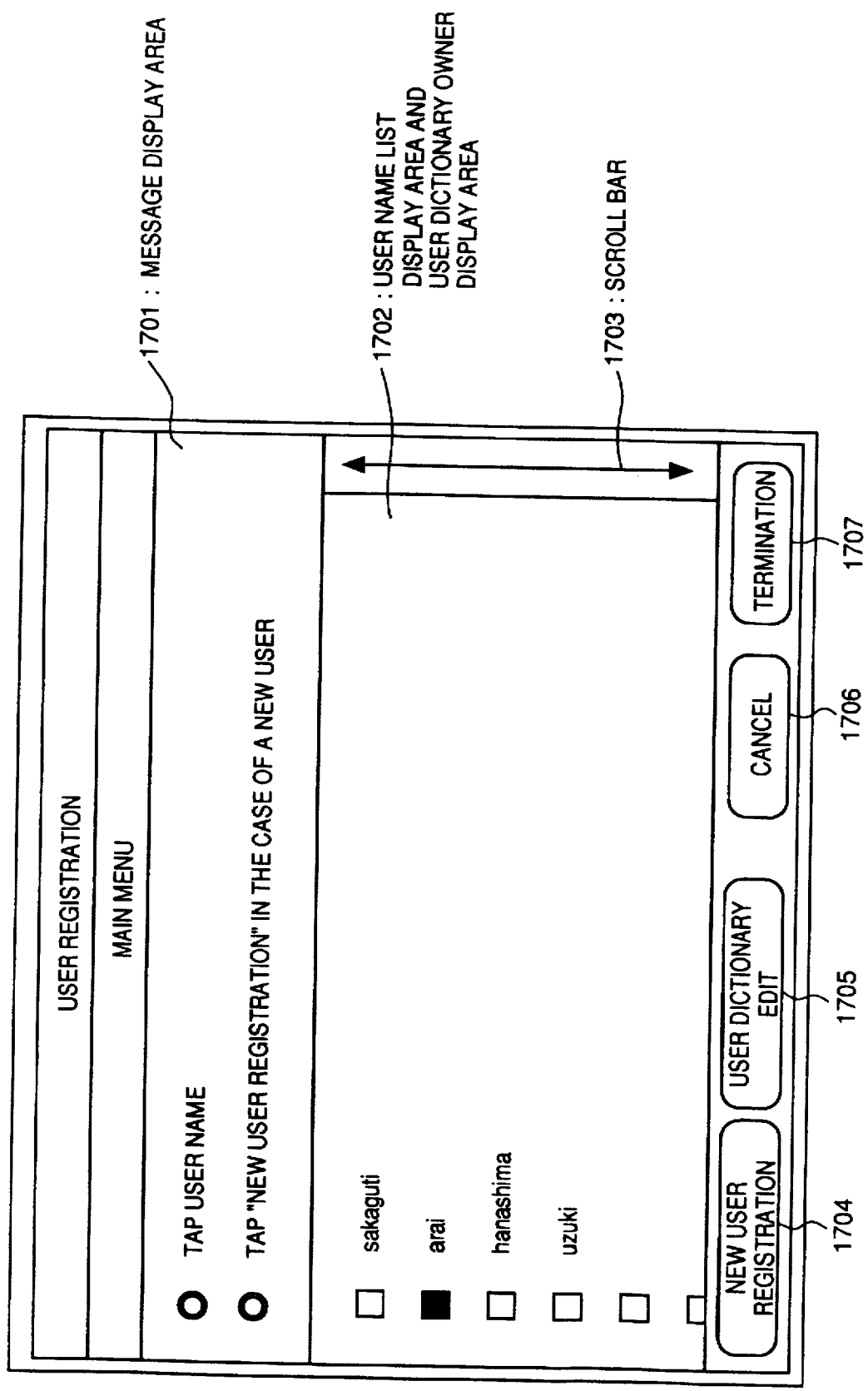
FIG. 17 is a diagram showing a initial screen.

In FIG. 17, reference numeral 1701 denotes a message display area, 1702 denotes user name list display area, 1703 denotes a scroll bar for scrolling the displayed information when the number of the users is too great to be displayed in the area at the same time, and reference numerals 1704 to 1707 denote buttons for calling functions via pen selection.

Figure 3:
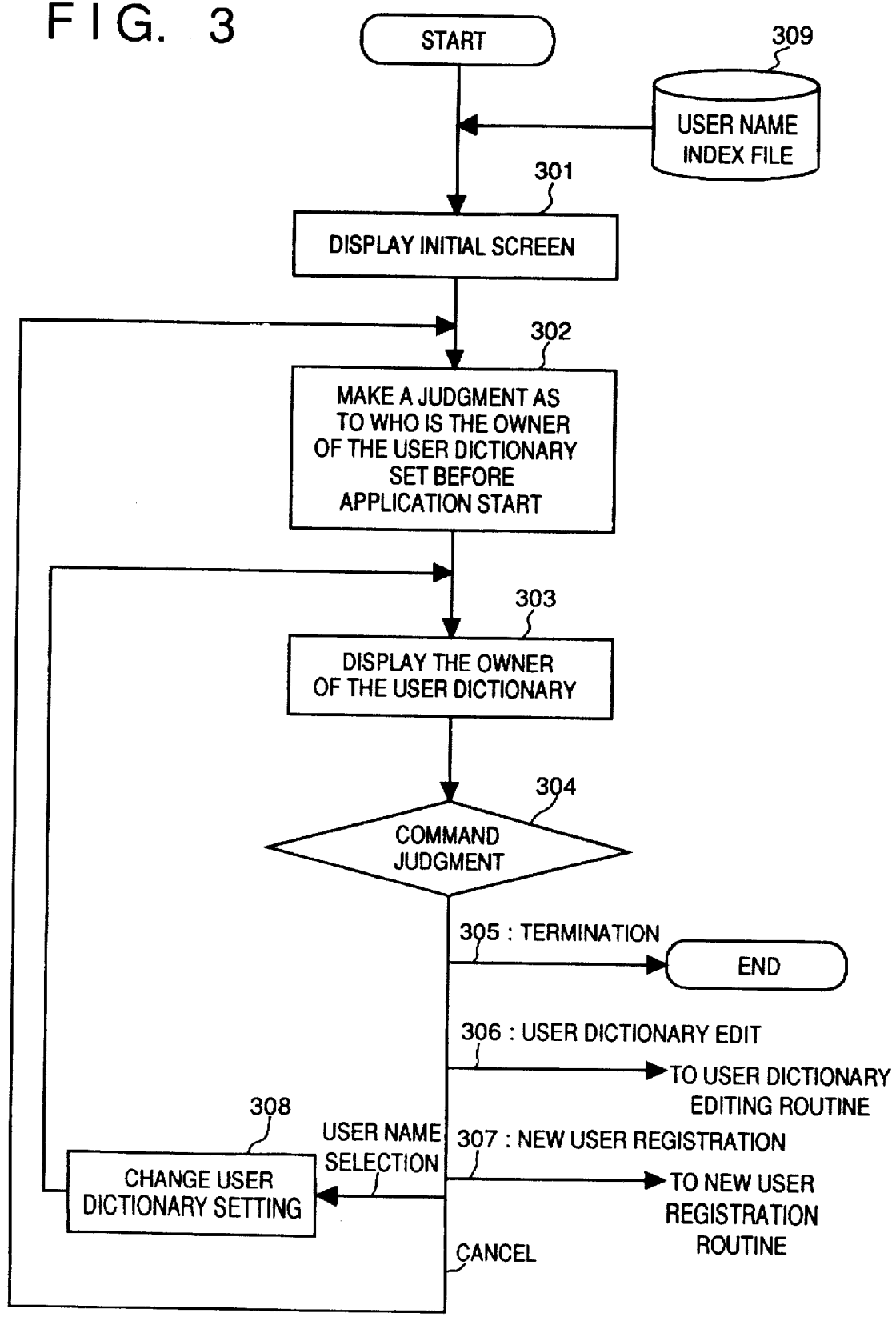
FIG. 3 is a flowchart showing an initial screen section.
Figure 23:
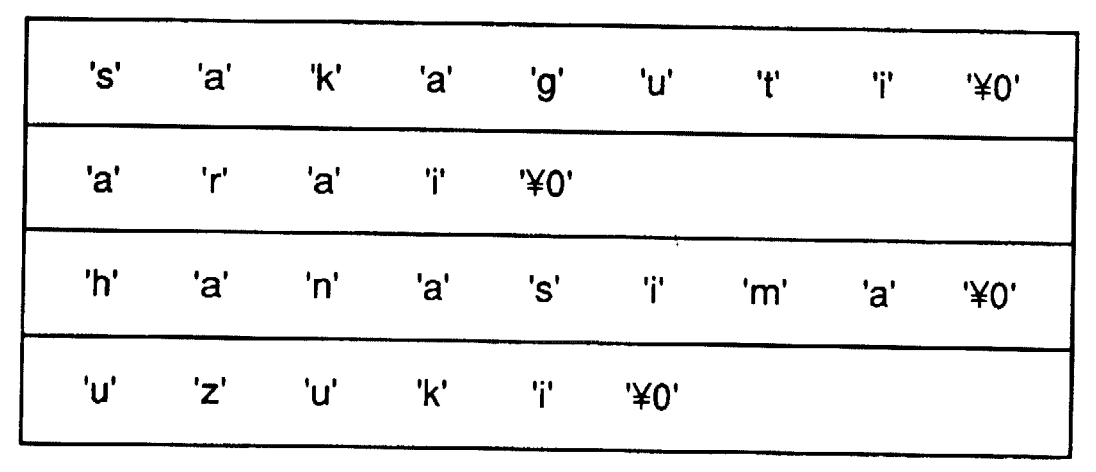

When the user character pattern registration application program is started, a window is formed in step 301 as represented in FIG. 3. Then, the registered user names are read from the user name index file 309 and written into the window. This user name index file is a disk file having a structure such as that shown in FIG. 23, wherein information can be read from and written into this file. The window is formed as shown in FIG. 17.

In step 302, the owner of the user dictionary registered in the system is determined. Then, in step 303, the owner name of the user dictionary displayed in the user name display area 1702 of FIG. 17 is marked. In the case of FIG. 17, the user having the user name "arai" is the owner. At this point, the process waits for a command to be given by the user (step 304). If a user name is selected directly via a pointing device such as a pen, a request for switching the owner of the user dictionary is issued, and the corresponding setting is performed in step 308.

If some button is selected, the operation is performed depending on the button as described below. If the "user dictionary edit" button 1705 is selected, the user dictionary editing section is called via the branch 306. If the "new user registration" button 1704 is selected, the new user registration section is called via the branch 307. In the case where the "cancel" button 1706 is selected, the setting with respect to the user dictionary associated with the current user is canceled and the setting with respect to the user dictionary is restored to the original state in which the user dictionary was when the application program was started. On the other hand, if the "termination" button 1707 is selected, then the user character pattern registration application program is completed and the control is returned to the system via the branch 305.

New User Registration Screen Section

Figure 4:
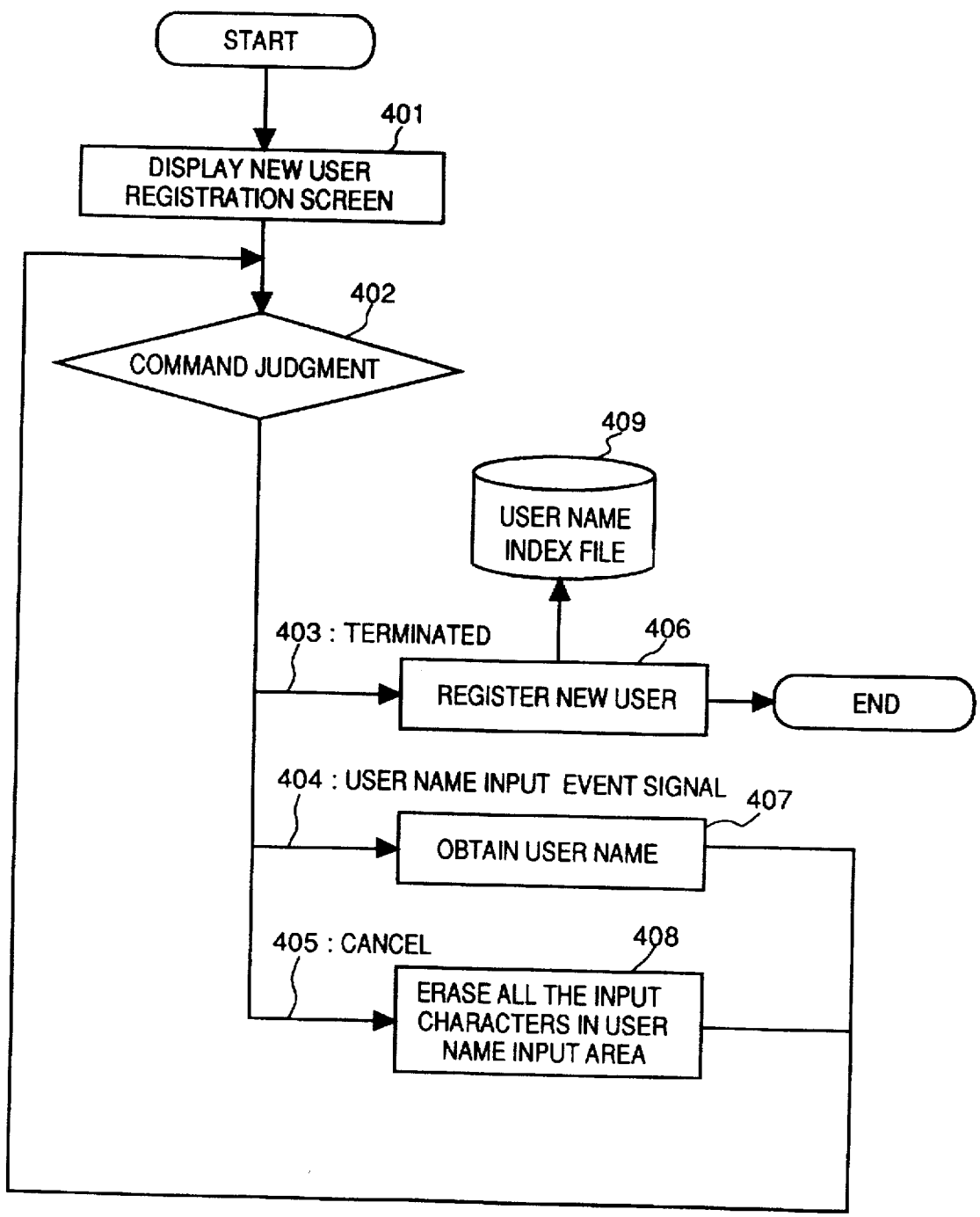
FIG. 4 is a flowchart showing a new user registration screen section.
Figure 18:
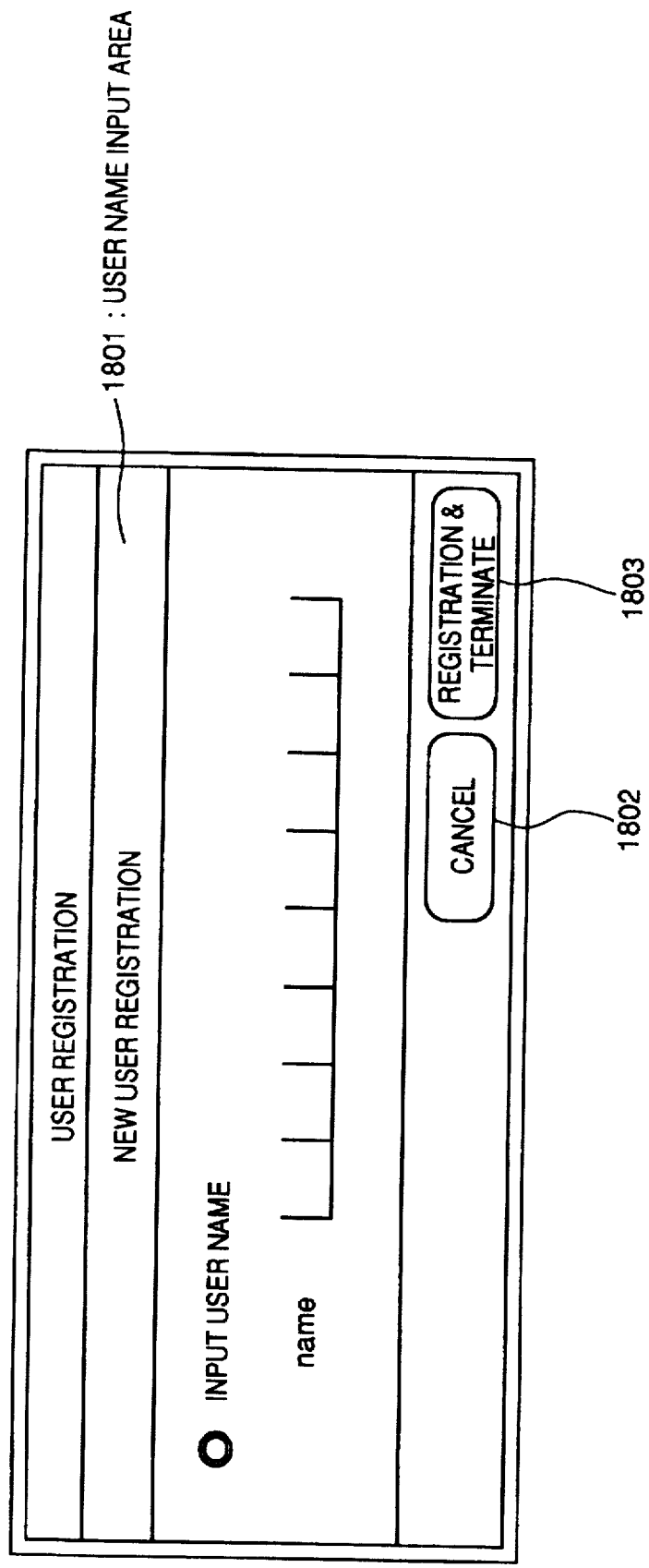
FIG. 18 is a diagram showing a new user registration screen.

Referring to FIG. 18 as well as the flowchart shown in FIG. 4, the process flow associated with the new user registration screen section will be described below.

In FIG. 18, reference numeral 1801 denotes a user name input area for inputting a user name, reference numeral 1802 denotes a functional button for canceling the input of a user name, and reference numeral 1803 denotes a functional button for registering an input user name and then terminating from the window.

In the initial screen, if the "new user registration" command 1704 is selected, then a pop-up window appears as shown in FIG. 18 (step 401). Then, the process waits for a command to be given by the user. If a pen-down operation is performed in the user name input area 1801 and thus if the resultant event signal is detected, then the existing character recognition section is called via the branch 404. In this character recognition section, handwritten character pattern written in the user name input area is recognized on line, and the character data is converted into a character code (step 407).

If the "register and terminate" button command 1803 is selected, a user name that has been input and converted via the user name input area is regarded as a new user name, and registered in the user name index file 409 (step 406). Then, the window associated with the character recognition section is closed and the control returns to the initial screen again. On the other hand, if the "cancel" button command 1802 is selected, all characters input in the user name input area are deleted (step 408), and then the process waits for another user name input command.

User Dictionary Editing Section

Figure 5:
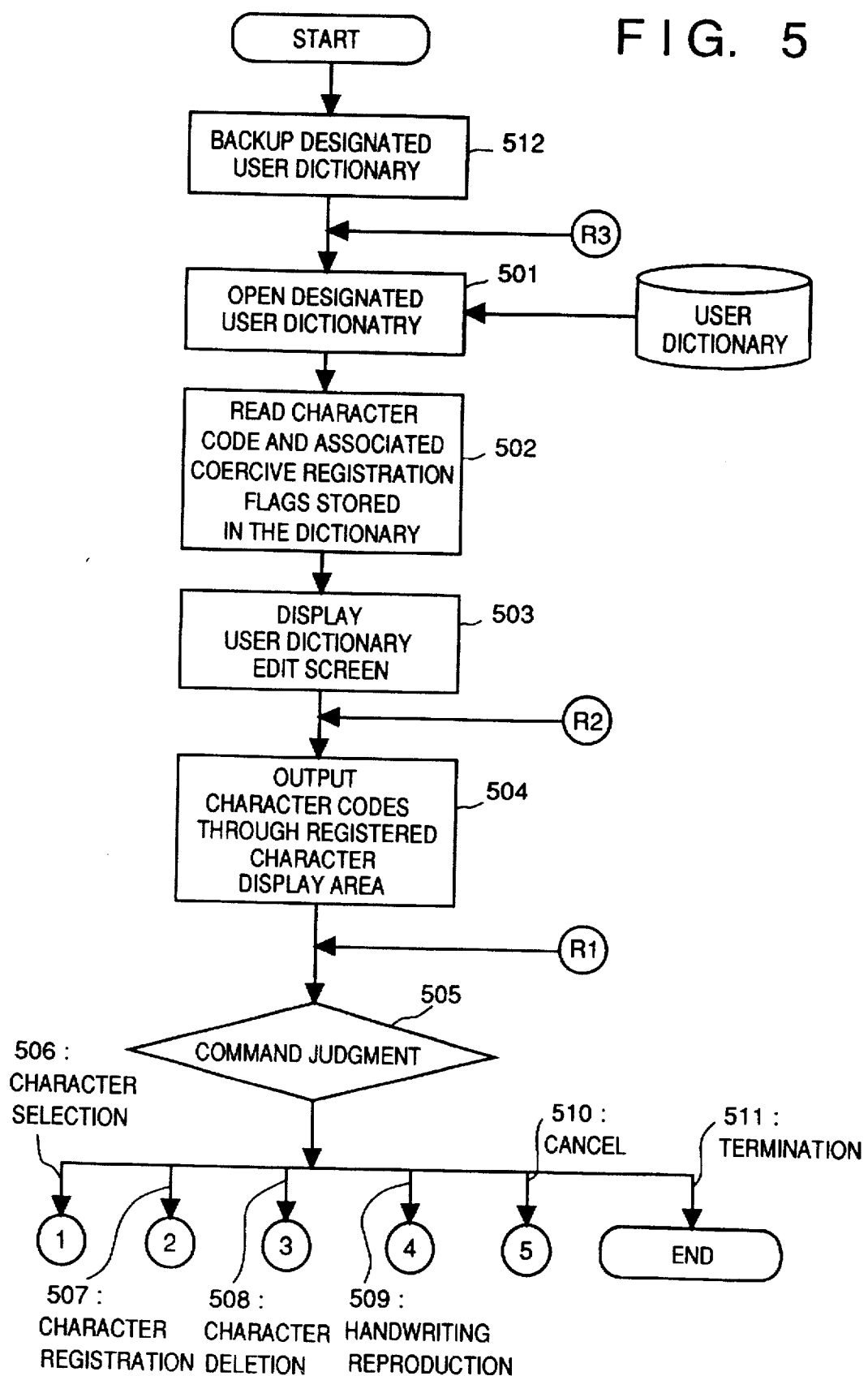
FIG. 5 is a flowchart showing a user dictionary editing section.

Now, the process flow in the user dictionary editing section will be described referring to FIG. 21 as well as the flowchart shown in FIG. 5.

Figure 21:
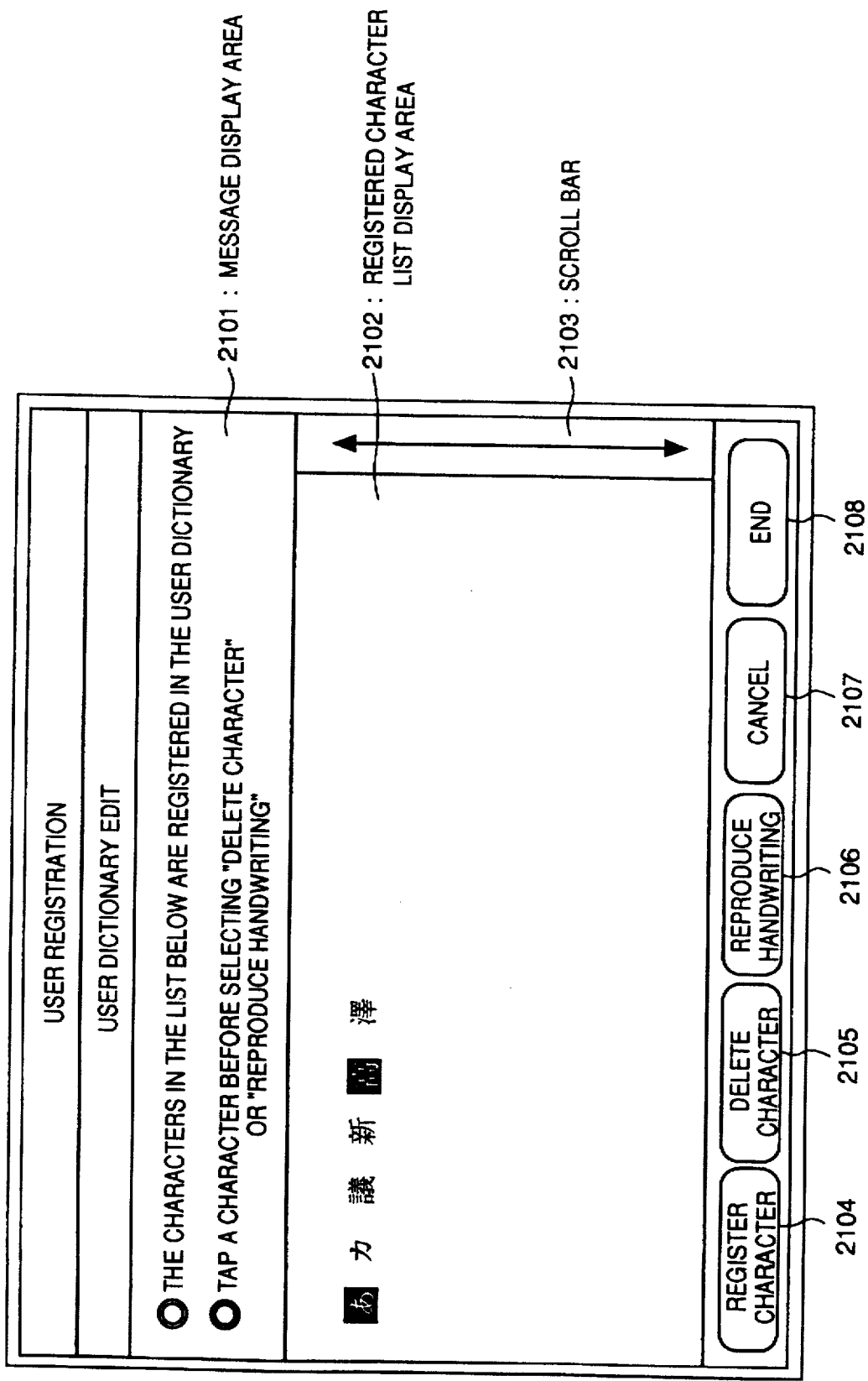
FIG. 21 is a diagram showing a user dictionary editing screen.

In FIG. 21, reference numeral 2101 denotes a message display area, reference numeral 2102 denotes an area for displaying a list of registered characters, reference numeral 2103 denotes a scroll bar used to display a large number of registered characters, and reference numerals 2104 to 2108 denote buttons for calling functions via pen selection.

In the initial screen shown in FIG. 17, if the "user dictionary edit" 1705 is selected, a designated user dictionary is copied and the duplication is stored at a proper location (step 512). This is done because the backup copy is required when it is desired to cancel the editing of the dictionary. In step 500, the user dictionary is opened, and then in step 502, character codes and coercive registration flags stored in the user dictionary are read into a buffer area. The coercive registration flag and coercive registration will be described in detail in "new character registration section".

Figure 6:
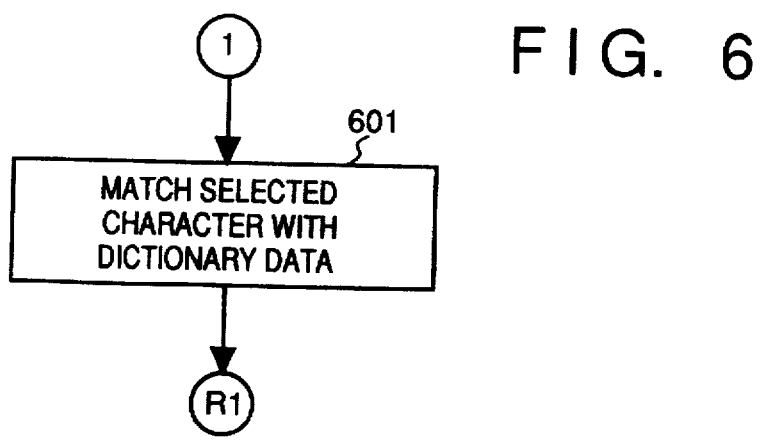
FIG. 6 is a flowchart showing a user dictionary editing section.

In step 503, the user dictionary edit screen is displayed. To achieve a one to one correspondence between the characters stored in the user dictionary and the characters to be displayed, a character code correspondence table has been created beforehand in step 601 as shown in FIG. 6. FIG. 24 illustrates an example of a character code table for the case where six characters are registered. When a character is edited using the "delete" or "reproduction" command, if the dictionary includes a plurality of character data corresponding to the same character code and if such a character code correspondence table is not prepared, it is impossible to correctly retrieve unique character data from the dictionary.

If the coercive registration flag read in step 502 has a value of "1", then "1" is written in the coercive registration field of the character code correspondence table. On the other hand, if the coercive registration flag has a value of "0", then "0" is written in the coercive registration field of the character code correspondence table. According to the character code correspondence table, the user dictionary edit screen is displayed in step 503 as shown in FIG. 21. Thus character codes are read and displayed in the registered character list display area 2102 in step 504. In this displaying step, if the value in the above-described coercive registration field is "1", then the corresponding character is highlighted in a reverse video mode so as to indicate that the character was registered in a coercive manner. It is apparent that the highlighting for indicating unreliable characters is not limited to the reverse video mode, and various highlighting techniques by means for example of changing in colors, contrast, display densities, outlines, etc., may also be applied.

Then in step 502 the operation process waits for a command to be given by the user. If a pen-down operation is performed in the registered character list area 2102 and thus if the resultant signal is detected, then the character designated by the pen-down operation is selected (branch 506). From the information of the position at which the selected character is located, the display number in the character code table is determined. Furthermore, from this display number, the location in the user dictionary at which the dictionary character data is actually stored is determined, and thus dictionary character data to be edited is obtained.

Figure 7:
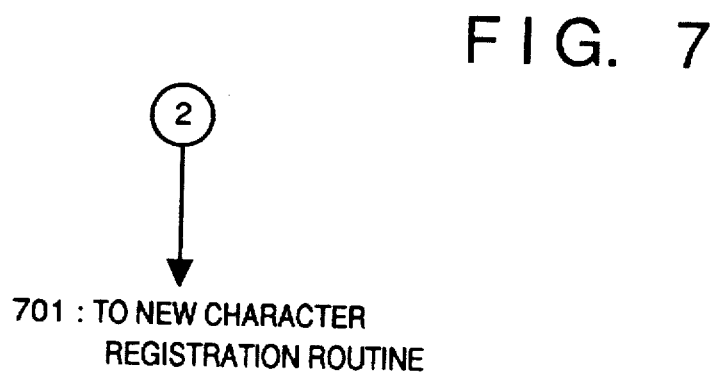
FIG. 7 is a flowchart showing a user dictionary editing section.
Figure 8:
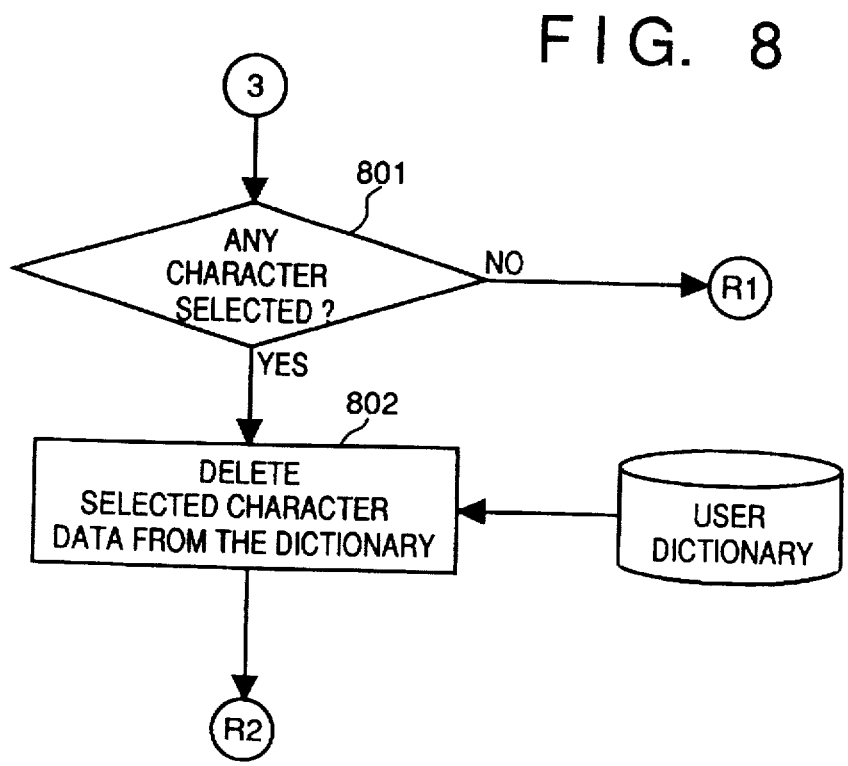
FIG. 8 is a flowchart showing a user dictionary editing section.

If the "register character" button command 2104 is selected (branch 507), the new character registration section is called (step 701 in FIG. 7). In FIG. 21, if the "delete character" button command 2105 is selected (branch 508), it is judged whether some character in the registered character list area is selected (step 801 in FIG. 8). If no characters are selected, the operation process waits for a further command in step 505. If some character is selected, then the process proceeds to step 802 in which the location in the dictionary at which the data of the character to be deleted is stored is searched referring to the above-described character code correspondence table. When the location is found, the character data is removed from the user dictionary. When the contents of the user dictionary are modified, the character code correspondence table is also modified and the characters displayed in the registered character list area are updated in step 504.

Figure 9:
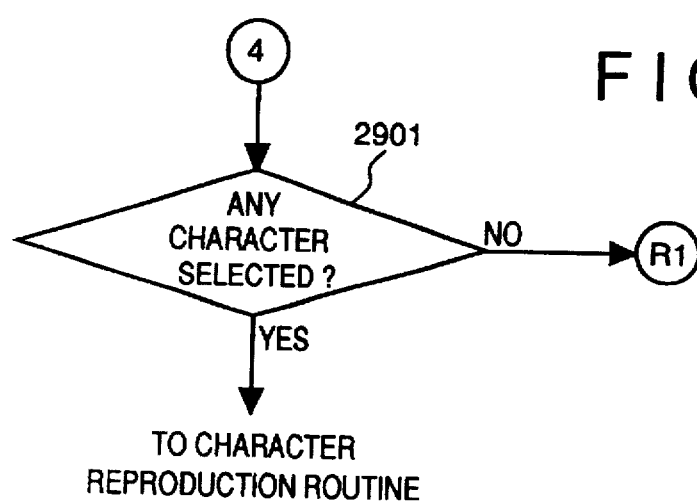
FIG. 9 is a flowchart showing a user dictionary editing section.
Figure 10:
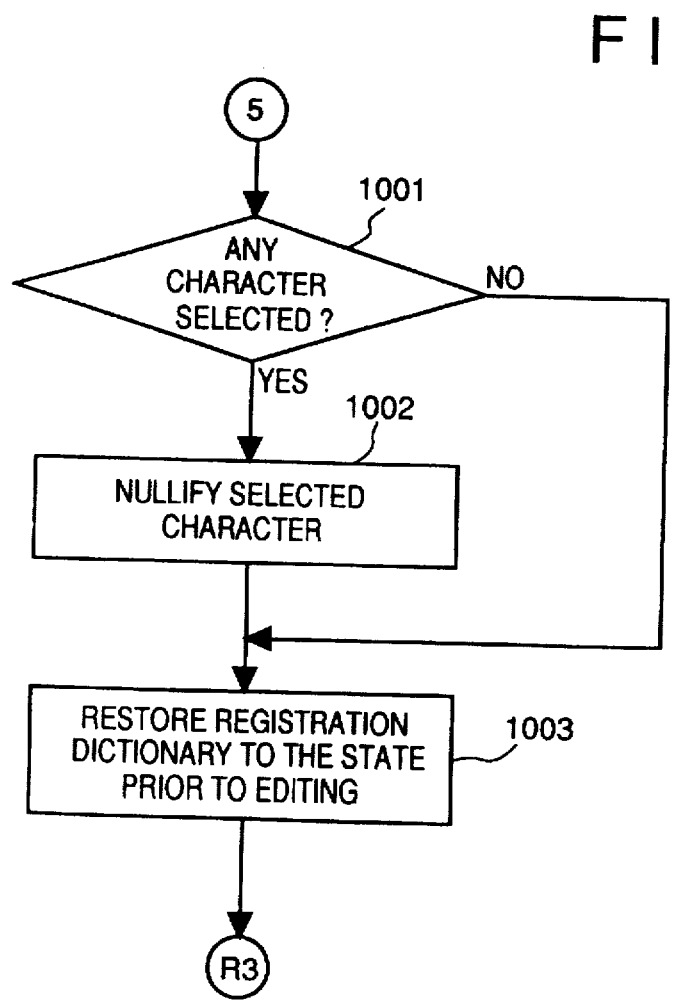
FIG. 10 is a flowchart showing a user dictionary editing section.

In the case where the "reproduce handwriting" button 2106 is selected (branch 509), the process proceeds to step 901 shown in FIG. 9 in which it is determined whether a character is selected. If a character is selected, then the handwritten character reproduction section is called. If no character is selected, then the process waits for a character to be selected. On the other hand, if the "cancel" button command 2107 is selected (branch 510), it is checked whether a character in the registered character list area is selected (step 1001 in FIG. 10). If a character is selected, the selection of the character is canceled and the display on the screen is also changed such that no character is selected (step 1002). Then, the contents in the relating dictionary are restored to the original state in which the dictionary was before the dictionary edit screen was called (step 1003) so that another editing operation can be performed. In the case where the "end" button command 2108 is selected, the user dictionary edit screen is closed and the control returns to the initial screen.

New Character Registration Section

Figure 11:
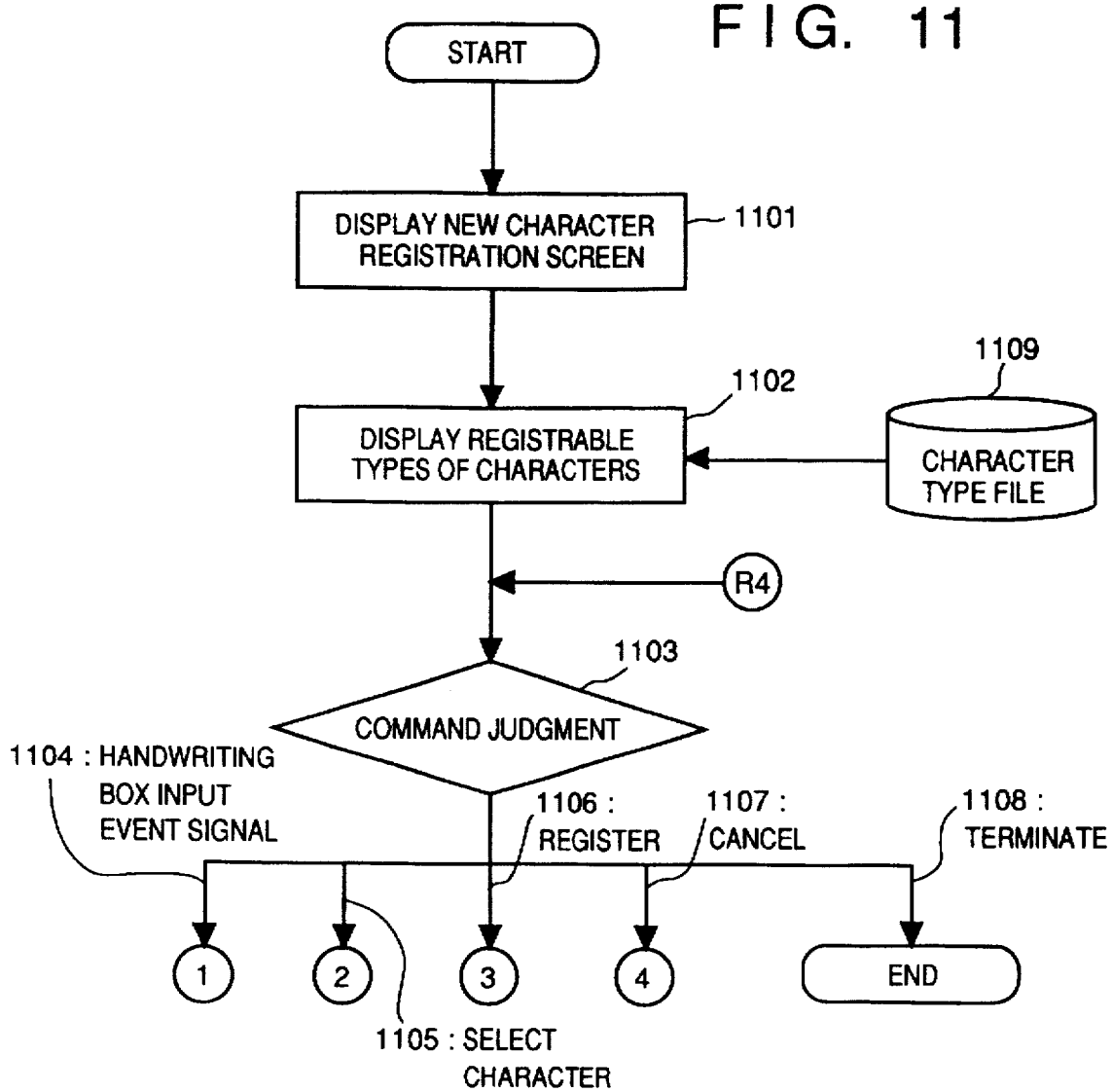
FIG. 11 is a flowchart showing a new character registration section.
Figure 12:
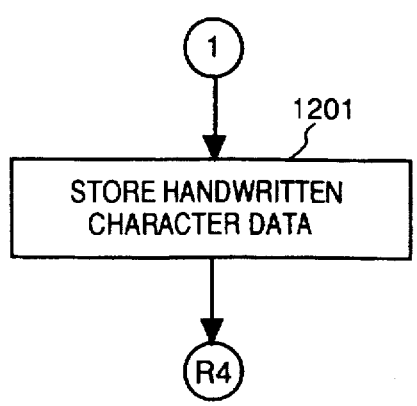
FIG. 12 is a flowchart showing a new character registration section.
Figure 13:
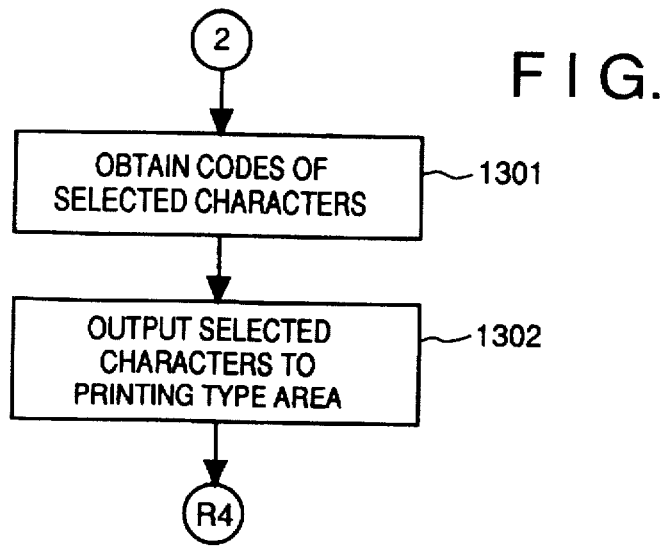
FIG. 13 is a flowchart showing a new character registration section.
Figure 14:
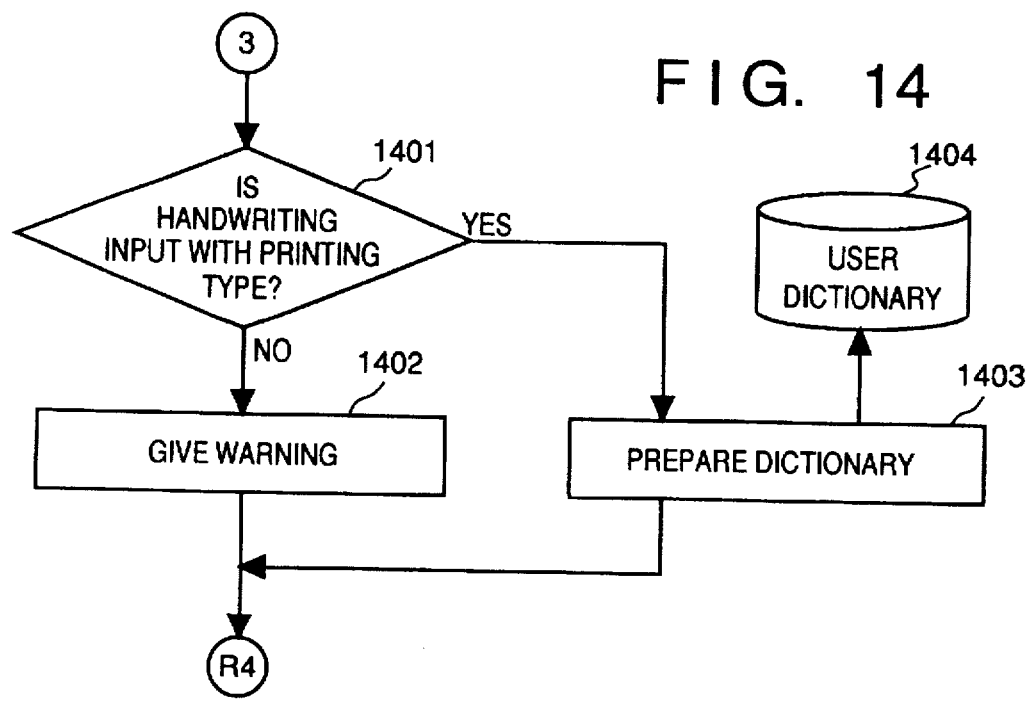
FIG. 14 is a flowchart showing a new character registration section.
Figure 15:
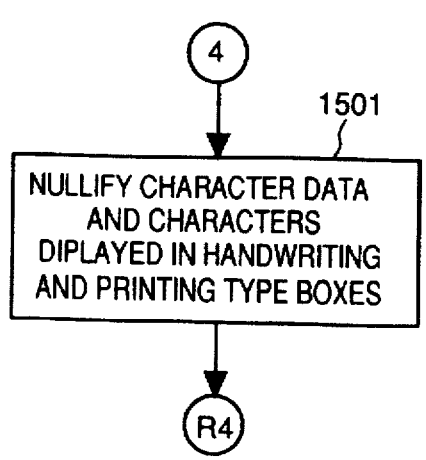
FIG. 15 is a flowchart showing a new character registration section.
Figure 19:
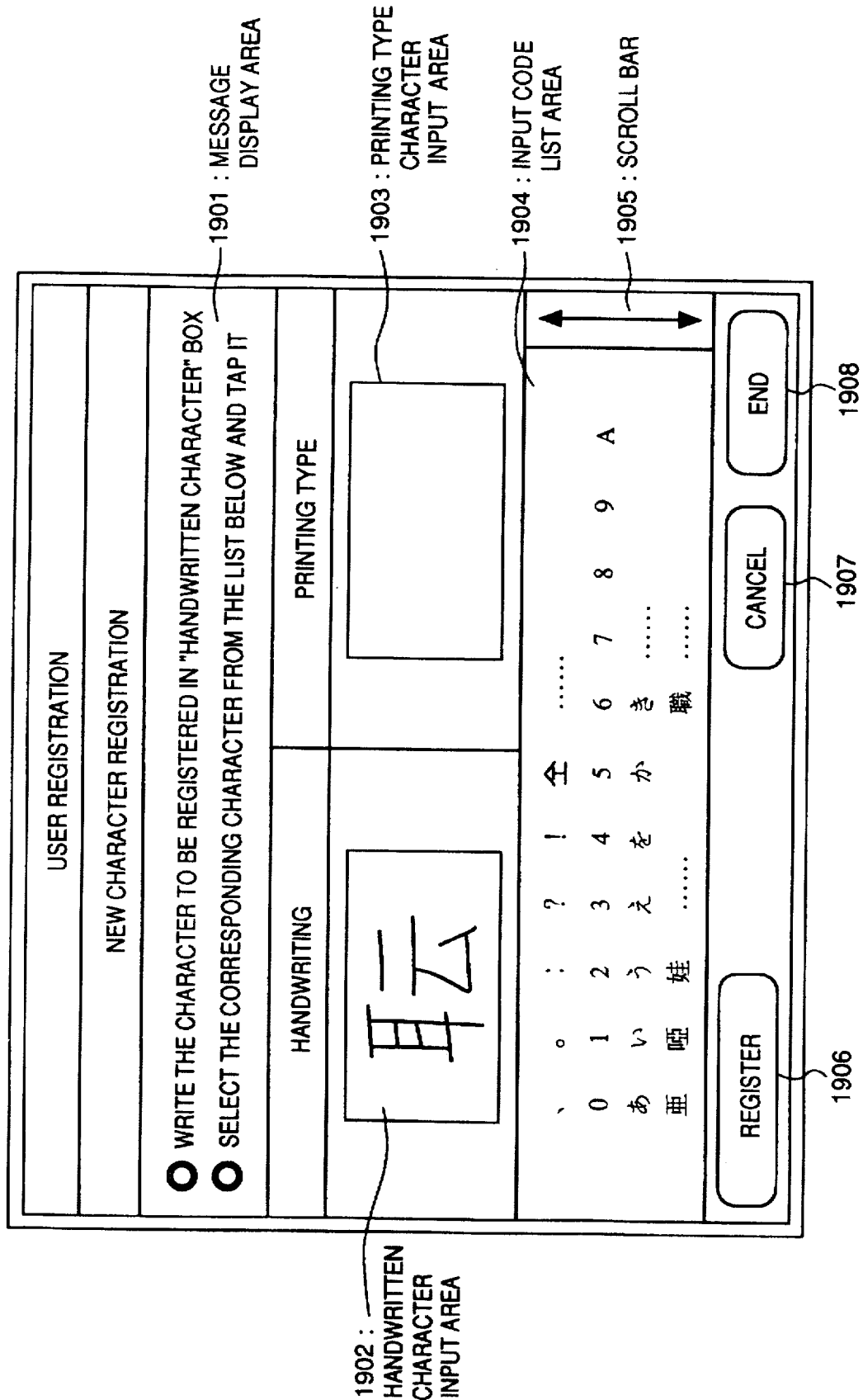
FIG. 19 is a diagram showing a new character registration screen.
Figure 20:
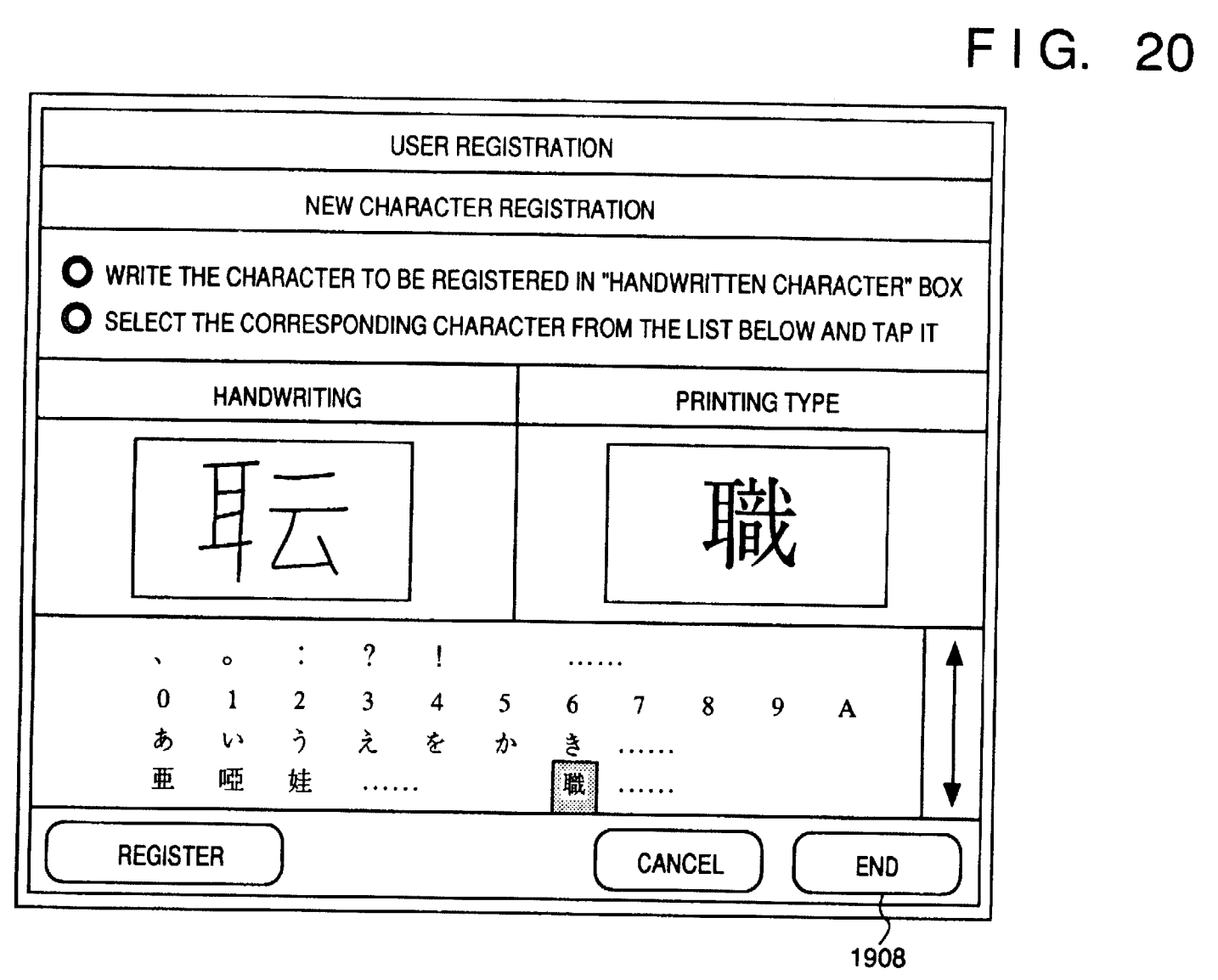

Referring to FIGS. 19 and 20 as well as the flowchart shown in FIG. 11, the process flow in the new character registration section will be described below.

In FIG. 19, reference numeral 1901 denotes a message display area, reference numeral 1902 denotes a handwritten character input area, reference numeral 1903 denotes a printing character input area, reference numeral 1904 denotes an input code list area, reference numeral 1905 denotes a scroll bar for enabling a plurality of characters to be displayed, and reference numerals 1906 to 1908 denote buttons for calling functions via pen selection.

In the user dictionary editing screen (FIG. 21), if the "register character" 2104 is selected, a pop-up window having a frame such as that shown in FIG. 19 is displayed (step 1101). In this invention, the term "register character" is used to refer to the operation of assigning character data of a specific handwritten character given by a user to a corresponding character code. To accomplish the character registration, it is required that there is provided a data input area for acquiring character data of a handwritten character pattern given by a user as well as a character code input area for inputting the corresponding character code. In FIG. 19, the "handwritten character" area 1902 serves as the handwritten character data input area, and "printing character" area 1903 serves as the character code input area. In the area 1904 at the lower and center of FIG. 19, there is shown a list of input codes, that facilitates inputting of character codes. A character code can be input by selecting the corresponding character from this list. It is required that all possible characters to be registered can be displayed in the input code list area 1904. This can be achieved by creating a character file 1109 containing all possible characters to be registered. Thus, characters that can be registered are read from this file and indicated in the input code list area 1904 (step 1102). When the indication of the possible characters is complete, the operation process waits for a further command to be given by the user (step 1103).

If a pen-down signal given by the user via the "handwritten character" area is detected, the branch 1104 is selected, and the handwritten character data in the form of a set of two-dimensional coordinates is stored in the buffer area (step 1201 in FIG. 12), and also displayed in the "handwritten character" area. In FIG. 19, there is shown a character in the abbreviated form of 職 (a kanji or Japanese character "shoku" meaning a job) that has just been written by the user. As described above, the corresponding character code is input by selecting a character from the list of input character codes. The character code corresponding to the selected character is stored in the buffer area temporarily, and then acquired (step 1301 in FIG. 13). Each time a character is selected, the selected character is displayed in an enlarged fashion in the printing type character area (step 1302).

If the "register" button command 1906 is selected, it is checked whether a handwritten character has been input in the "handwritten character" area and the corresponding character has also been input in the printing type character area (step 1401). If yes, then a recognition dictionary associated with the character is created (step 1403). This recognition dictionary can be created by generating a standard pattern from the character data according to a known technique. As a result, the standard pattern is stored in a new or existing user dictionary 1404. If the handwritten character data or the character code is input incorrectly, a warning is indicated (step 1402) and the process is repeated so that both handwritten character data and character code corresponding to the character to be registered are input correctly. In this process, the standard pattern can be generated using a known technique.

An Example of Registration of Character Data into a User Dictionary

FIG. 26 illustrates process steps of registering character data into a user dictionary.

Character data 2600 stored in the buffer area is processed for recognition in a character recognition section 2601. In this step, the recognition is carried out using both basic dictionary 107 and user dictionary 106. Then, the recognition result is sent to a recognition result evaluation section 2602 in which the recognition reliability of the character pattern as a standard pattern is evaluated.

The recognition reliability is evaluated in a manner as described below.

In this example, a user is going to register a handwritten character pattern corresponding to a printing type character 職 ("shoku"). There are four possibilities regarding the result of the recognition given by the character recognition section 2601. FIG. 27 shows these four possibilities in the form of a reliability evaluation table. In this FIG. 27, the "threshold refers to a reference value for evaluating the reliability level of the recognition result on the basis of the evaluated value. Among the four possibilities, in the cases of (1) and (2) in FIG. 27, since the correct printing type character 職 is taken as the highest-possibility candidate, the character data can be registered in the user dictionary with no problems. On the other hand, in the case of (3) in FIG. 27, since a character other than the correct character 職 ("shoku") is taken in the recognition result as the highest-possibility candidate at a high reliability level of which is high, it is unsuitable to register the character data in the user dictionary (because the recognition dictionary contains another character conflicting with the character to be registered). In the case of (4) in FIG. 27, a character other than the correct character 職 ("shoku") is also taken in the recognition result as the highest-possibility candidate. However, in this case, since the reliability level is low, the handwritten character data can be registered in the user dictionary because a possibility that the handwritten character data is correctly recognized as 職 is high.

Thus, only in the case of (3) in FIG. 27, a warning message is indicated in a registering section 2603 as shown in FIG. 28 so that the user can determine whether the data should be registered. In response to the warning message, if "No" is selected, then the registration is canceled and the process control returns to the command processing step 1103 in FIG. 11. If "Yes" is selected, the handwritten character and the character code with a coercive registration flag of "1" is stored in the user dictionary 106. On the other hand, in the case of (1), (2), or (4) in FIG. 27, the handwritten character data and the character code with a coercive registration flag of "0" are stored in the user dictionary 106 (1404).

Figure 29:
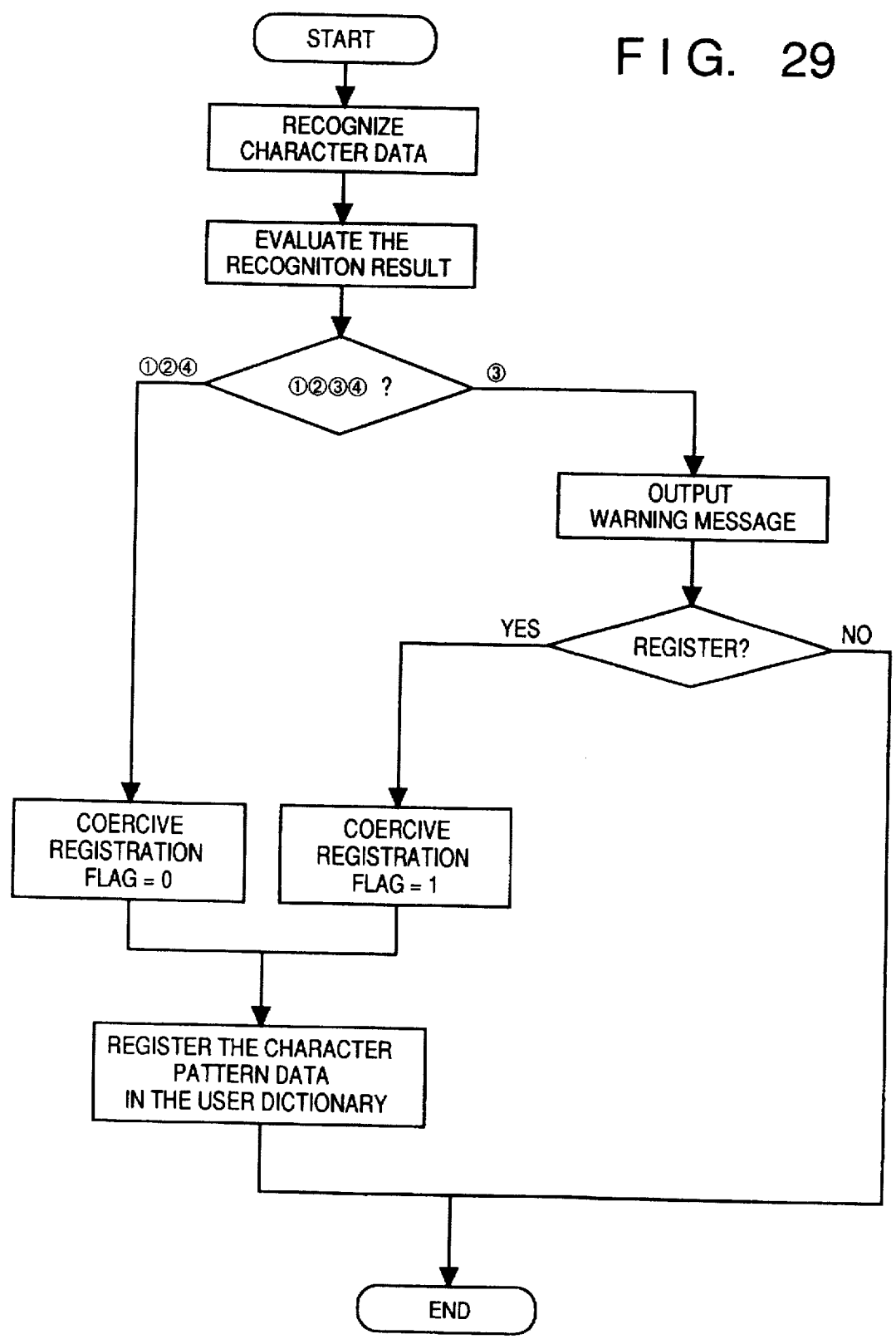
FIG. 29 is a flowchart showing a process flow relating to a registration warning process.

FIG. 29 is a flowchart illustrating the flow associated with the above-described registration warning process.

In the case where "cancel" button command 1907 is selected, the character data and the character code input in the "handwriting" area and the "printing type character" area, respectively, are canceled (step 1501 in FIG. 15) so that another data can be input. In FIG. 20, there is shown a character 職 ("shoku") that has been just selected from the list of character codes. In this state, if the "end" button command 1908 is selected, the new character registration window is closed and the process control returns to the user dictionary editing screen.

Handwritten Character Reproduction Section

Figure 16:
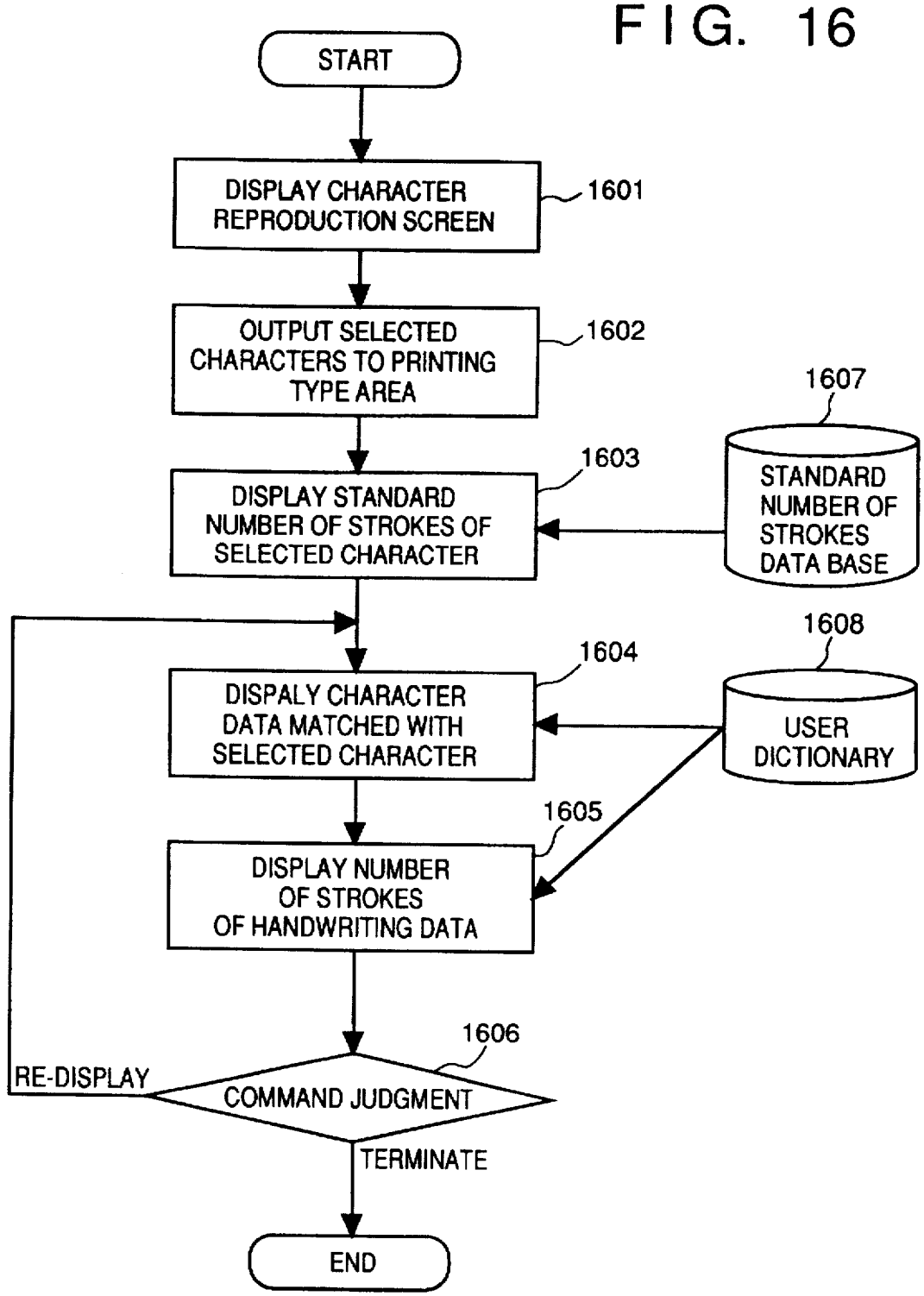
FIG. 16 is a flowchart showing a handwritten character reproducing section.

Now, the process flow in the handwritten character reproduction section will be described referring to FIG. 22 as well as the flowchart shown in FIG. 16.

Figure 22:
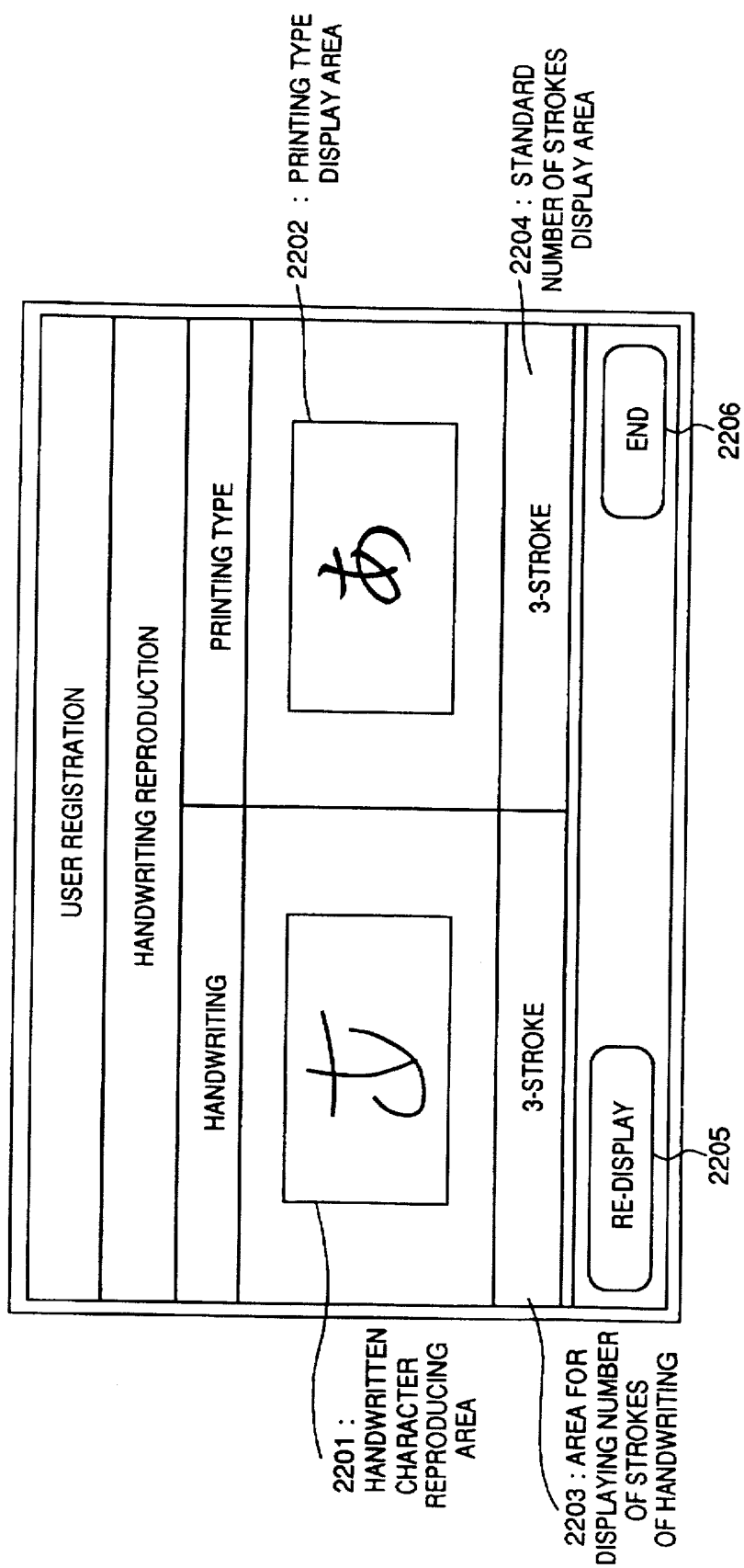
FIG. 22 is a diagram showing a handwritten character reproducing screen.

In FIG. 22, reference numeral 2201 denotes a handwritten character reproducing area, reference numeral 2202 denotes a printing type display area in which a printing type character corresponding to a handwritten character is displayed, reference numeral 2203 denotes an area for displaying the number of writing strokes of a handwritten character, reference numeral 2204 denotes an area for displaying the number of writing strokes of the printing type character, and reference numerals 2205 and 2206 denotes buttons for calling functions via a pen selection.

If "reproduce handwriting" 2106 is selected in the user dictionary editing screen (FIG. 21), a window frame is produced and shown in a pop-up window fashion as shown in FIG. 22 (step 1601). Furthermore, the character code that has been selected in the user dictionary editing screen is displayed in an enlarged font in the printing character display area (step 1602). In addition to the character in the enlarged font, the number of writing strokes of the character is also displayed (step 1603), which is performed by retrieving it from a database 1607 of standard character stroke numbers in which the standard character stroke number of each character is stored. To reproduce character data stored in the user dictionary, it is required to correctly extract data that corresponds uniquely to the selected character. This can be performed using the above-described character code correspondence table.

The dictionary data corresponding to a character includes coordinate points together with information representing a pen-down or pen-up operation. Therefore, it is possible to determine which stroke each coordinate point belongs to. Thus, coordinate points included in the same stroke are linked by a line from point to point thereby drawing a character pattern (step 1604). In this drawing process, the number of pen-down operations is counted, and the resultant number is displayed as the number of writing strokes of the handwritten character (step 1605).

In step 1606, if it is concluded that the "re-display" command 2205 has been selected, then the reproduction drawing data is deleted and the handwritten character is drawn again using the data stored in the dictionary. In the case where the "end" command 2206 is selected, the handwritten character reproduction screen is closed, and the process control returns to the user dictionary editing screen. FIG. 22 shows the middle of a drawing process of drawing the selected character あ (hiragana "a").

In the above-described embodiment, the formation of windows and the detection of various signals can be performed using a known technique. Furthermore, a pen is used as the pointing device in the above-described embodiment, a mouse can also be used for selecting and writing operations.

In the embodiment described above, when registered characters are displayed in the registered character list area of the user dictionary editing screen, coercively registered characters are highlighted in the reverse video mode so that the user can know that these characters were registered coercively. Alternatively, there may be provided a display switching button command for switching the display in the registered character list area between the coercive registration character display mode and the normal registration character display mode.

This alternative embodiment differs from the above embodiment only in the "user dictionary edit" section, and thus only this section will be described below referring to FIGS. 30 and 31 as well as the flowchart shown in FIG. 32. The other sections are performed in the same manner as in the previous embodiment.

Figure 30:
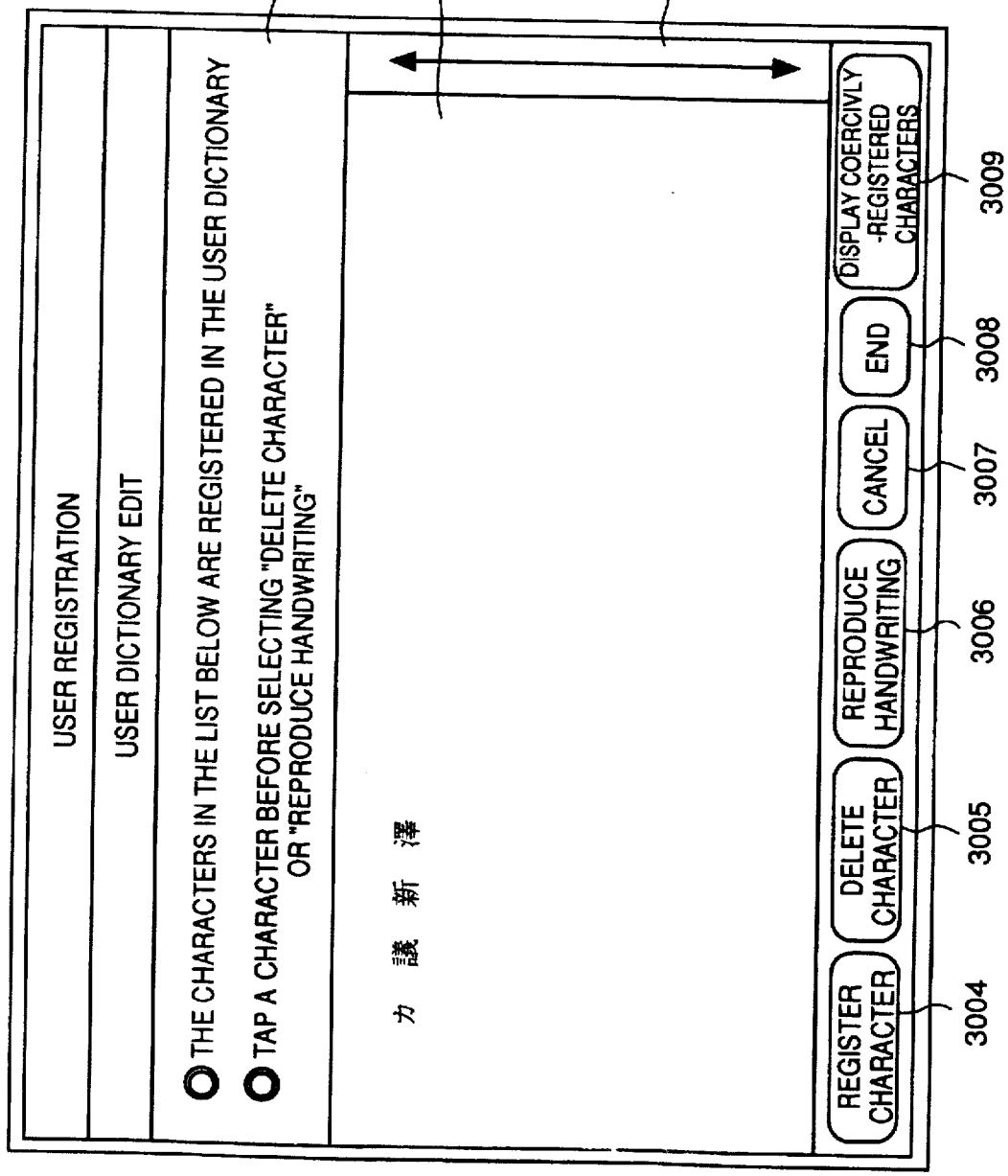
FIG. 30 is a diagram showing a user dictionary editing screen.

In FIG. 30, reference numeral 3001 denotes a message display area, reference numeral 3002 denotes an area for displaying a list of registered characters, reference numeral 3003 denotes a scroll bar that enables a large number of registered characters to be displayed, and reference numerals 3004 to 3009 denotes buttons for calling functions via a pen selection In the initial screen (FIG. 17), if the "user dictionary edit" 1705 is selected, a designated user dictionary is copied and the duplication is stored at a proper location (step 3212). Then in step 3202, the user dictionary is opened, and character codes and coercive registration flags stored in the user dictionary are read into a buffer area. A character code correspondence table is then created so that there is a one to one correspondence between the characters stored in the user dictionary and the characters to be displayed (step 601 in FIG. 6). FIG. 24 illustrates an example of a character code table for the case where six characters are registered. If the coercive registration flag read in step 3202 has a value of "1", then "1" is written in the coercive registration field of the character code correspondence table. On the other hand, if the coercive registration flag is "0", then "0" is written in the coercive registration field of the character code correspondence table.

According to the character code correspondence table, the user dictionary edit screen is displayed in step 3203 as shown in FIG. 30. In this displaying step, the character codes having a value of "0" in the coercive registration field are displayed in the registered character list area 3002 (step 3204). Then in step 3205, the operation process waits for a further command to be given by the user. In this state, if any of function call buttons 3004–3008 is pressed, a corresponding process is performed in the same manner as in the previous embodiment. If the "display the list of coercively registered character" button command 3009 is selected, then the character code correspondence table is referred to and characters having a value of "1" in the coercive registration field are displayed in the registered character list area 3002.

Figure 31:
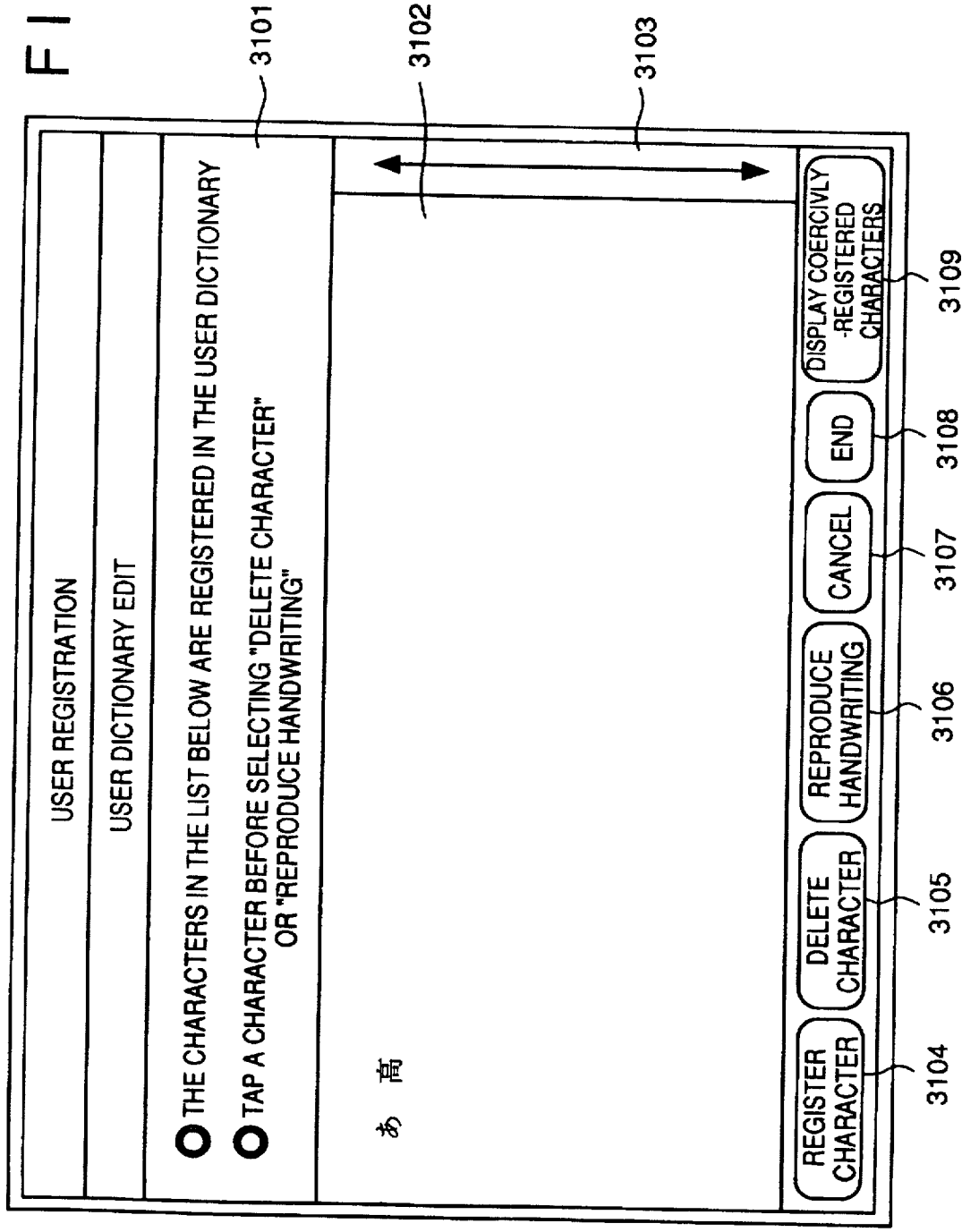
FIG. 31 is a diagram showing a user dictionary editing screen.
Figure 32:
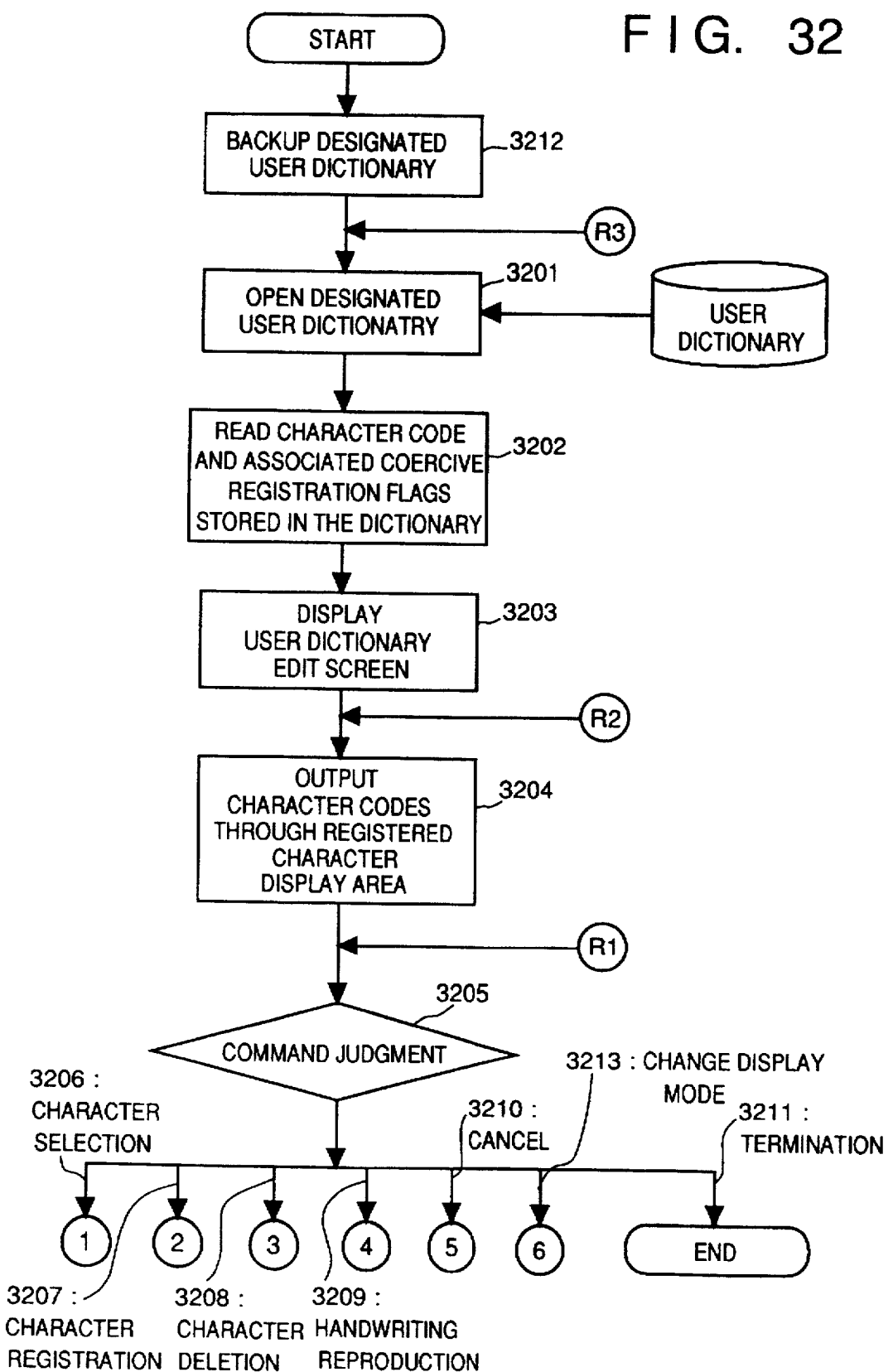
FIG. 32 is a flowchart showing a user dictionary editing process.

Furthermore, the indication "display the list of coercively registered characters" 3009 of the function call button is changed to "display the list of normally registered characters" 3109 (FIG. 31). Conversely, if the "display the list of normally registered characters" button 3109 is selected, then the character code correspondence table is referred to and characters having a value of "0" in the coercive registration field are displayed in the registered character list area. Furthermore, the indication "display the list of normally registered characters" 3109 of the function call button is changed to "display the list of coercively registered characters."

Embodiment 2

Now, referring to the accompanying drawings, a second embodiment according to the present invention will be described in detail below.

An Example of the Construction a Character Recognition Apparatus

Figure 33:
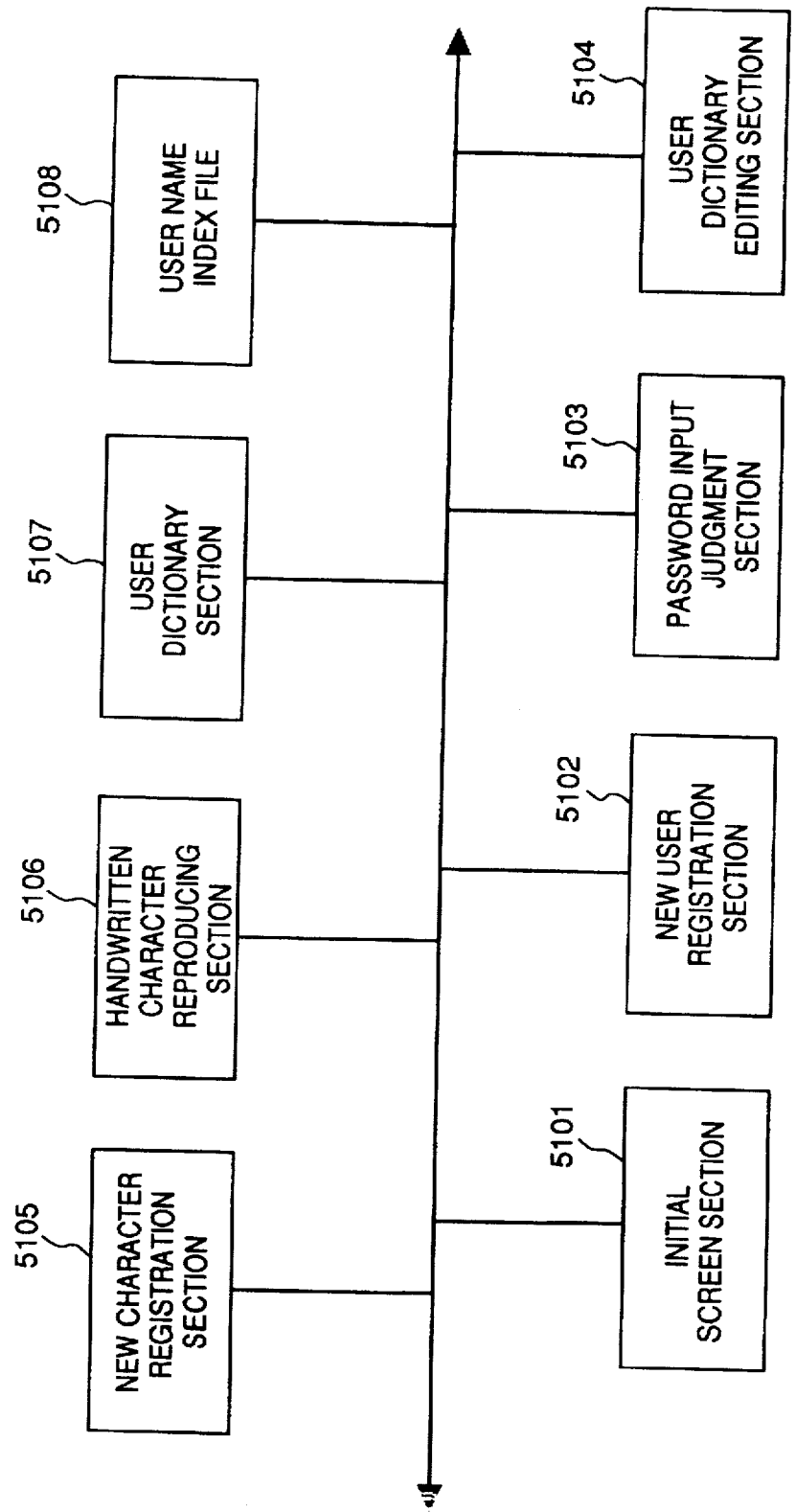
FIG. 33 is a block diagram showing a construction of a character recognition apparatus of the second embodiment.

FIG. 33 is a block diagram illustrating a user character pattern registration application program according to the present embodiment of the invention.

In this FIG. 33, blocks 5101–5107 represent functional elements relating to character registration performed by a user in on-line character recognition operations. These blocks include window application sections by means of a GUI (graphical user interface) and a user dictionary.

In the initial screen section 5101, a list of authorized users or owners of dictionaries are displayed. Furthermore, this initial screen section 5101 also includes button commands for calling a section for registering a new user and a section for editing a character registered in a user dictionary. The new user registration section 5102, as described above, is a section for registering a new user. In a password input judgment section 1503, a password input by a user is judged so as to determine whether or not the user should be allowed to edit the user dictionary. In a user dictionary editing section 5104, a list of characters registered in a user dictionary is displayed so that selected characters can be deleted and handwritten character patterns are reproduced. Furthermore, this section also includes the capability of calling a section for registering a new handwritten character pattern given by a user.

This character registration is performed in a new character registration section 5105 when it is called by the user dictionary editing section 5104. In a handwritten character reproducing section 5106, a handwritten character pattern corresponding to a character selected in the user dictionary editing section 5104 is reproduced according to the stored handwritten character data. The user dictionary section 5017 store information of registered characters for use in the above-described functions. The user dictionaries include a plurality of user dictionaries owned by different users. The block 5108 is a user name index file.

The construction of hardware for use in the present embodiment is similar to that in the previous embodiment described above referring to FIG. 25 except that the ROM 2501 includes a unique program. Thus, the hardware will not be described here again.

The Operation of the Character Recognition Apparatus

Figure 34:
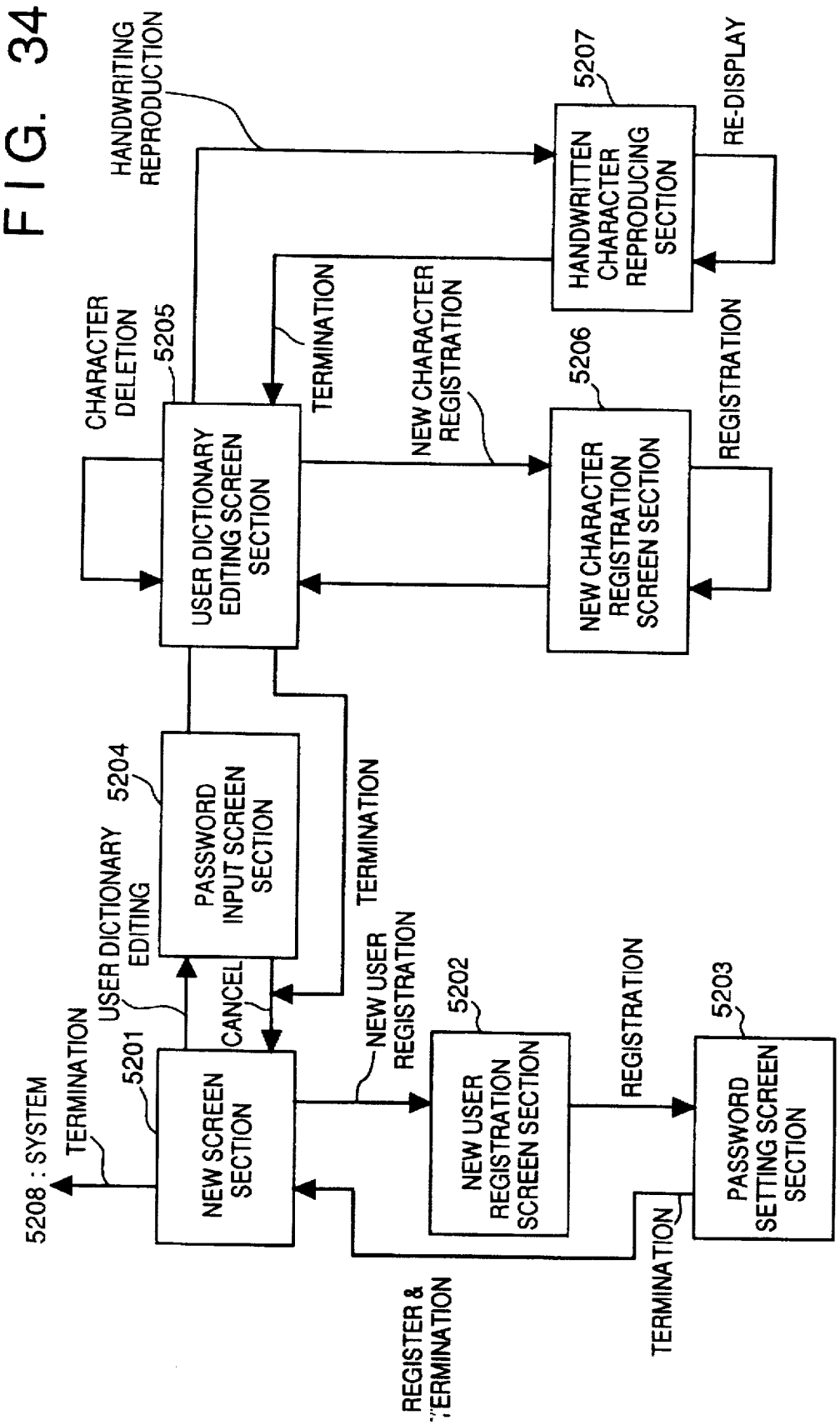
FIG. 34 is a window condition transition chart regarding the character recognition apparatus of the second embodiment.

FIG. 34 is a window condition transition chart associated with the user character pattern registration application program.

Each block 5201–5207 represents a window for executing the above-described sections. When the user character pattern registration application program is completed, the control is returned to the system 5207. In FIG. 34, arrows represent the flows of control commands executed via control buttons provided in respective windows. The flows and the window transitions will be described below.

In the new screen section 5201, if the "new user registration" command is selected, a new user registration screen 5202 in the form of a pop-up window appears. In this new user registration screen 5202, if the "registration" command is selected, a password setting screen 5203 appears. If the "termination" command is selected, this pop-up window is closed and the control returns to the new screen 5201.

In the new screen 5201, if the "user dictionary edit" command is selected, the new screen 5201 is closed and a password input screen 5204 appears. If a password input by a user is consistent, a user dictionary editing screen 5205 appears. In this state, if the "new character registration" command is selected, a new character registration screen 5206 in the form of a pop-up window appears. In this window, characters can be registered one after another unless the "termination" command is selected. After the registration of a character is completed, if the "termination" command is selected, the new character registration screen 5206 is closed and the control returns to the user dictionary editing screen 5205.

Similarly, the "character deletion" command can also be executed a plurality of times in the user dictionary editing screen 5205. Furthermore, if the "handwritten character reproduction" command is selected, the handwritten character reproduction screen 5207 in the form of a pop-up window appears. When the window has appeared, the reproduction of a handwritten character is immediately started. The reproduction of the handwritten character can be performed repeatedly by selecting the "re-display" command. If the "termination" command is selected, the handwritten character reproduction window is closed and the control returns to the user dictionary editing screen 5205.

In the user dictionary editing screen 5205, if the "termination" command is selected, the user dictionary editing window is closed and the starting screen 5201 is displayed again. Thus, if the "termination" command is selected in the new screen 5201, the control exits from the user character pattern registration application program, wherein this is an only way to exit from the user character pattern registration application program.

As can be seen from the above description, the number of windows associated with the user character pattern registration application program is two when the pop-up window of screen 5202, 5206, or 5207 is displayed, and one when the window of screen 5201, 5203, 5204 or 5205 is displayed.

The Operation Procedure of the Character Recognition Apparatus

The operations in the respective screens and the related flows will be described in more detail referring to FIGS. 35–49.

First, the process flow relating to the initial screen will be described referring to FIG. 50 as well as the flowchart shown in FIG. 35.

Figure 50:
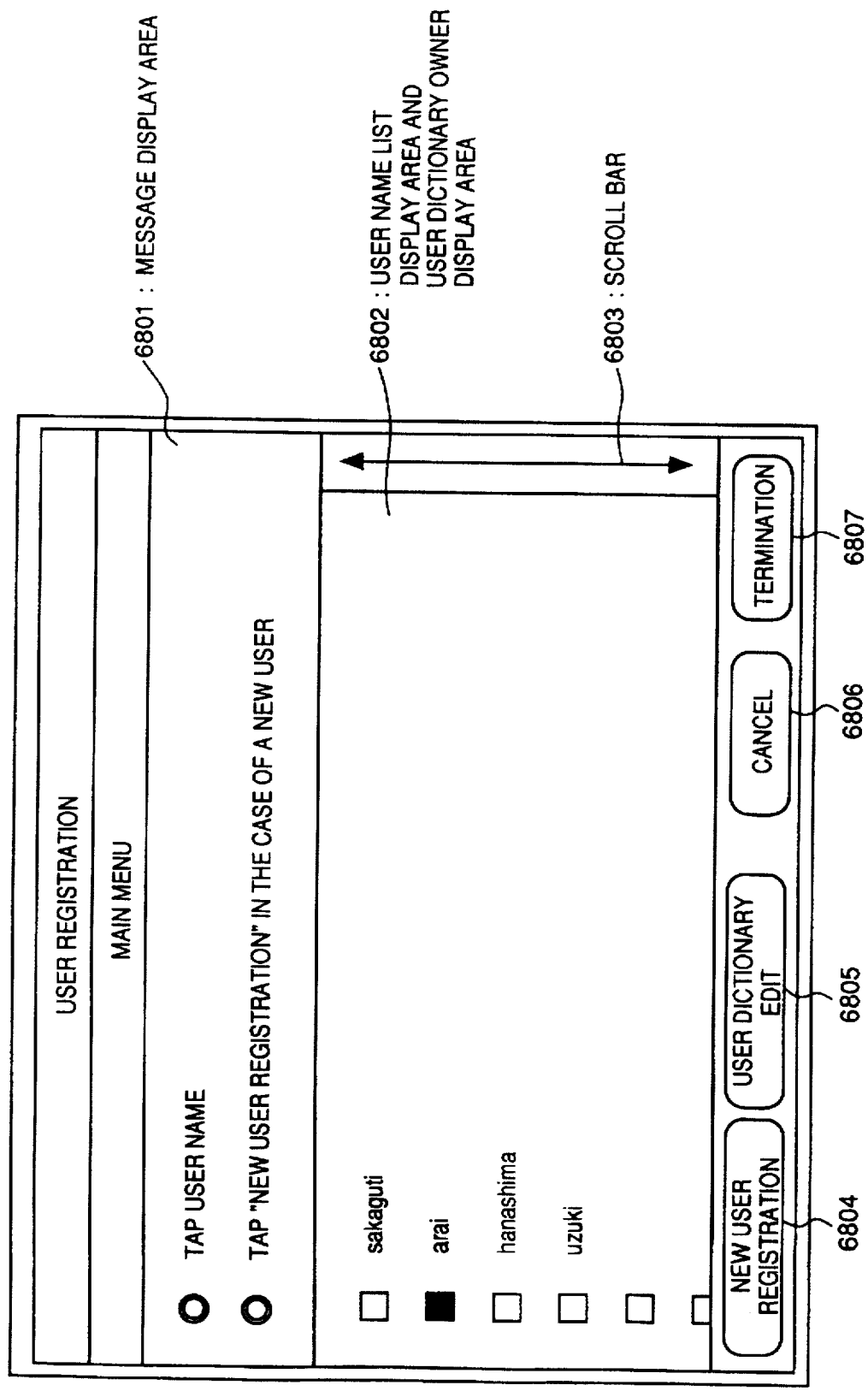
FIG. 50 is a diagram showing an initial screen.

In FIG. 50, reference numeral 6801 denotes a message display area, reference numeral 6802 denotes a user name list display area and use dictionary owner, reference numeral 6803 denotes a scroll bar used to scroll information displayed in the screen when the number of users is so great that the entire users cannot be displayed at the same time in the screen, and reference numerals 6804–6807 denote buttons for calling functions via a pen selection.

Figure 35:
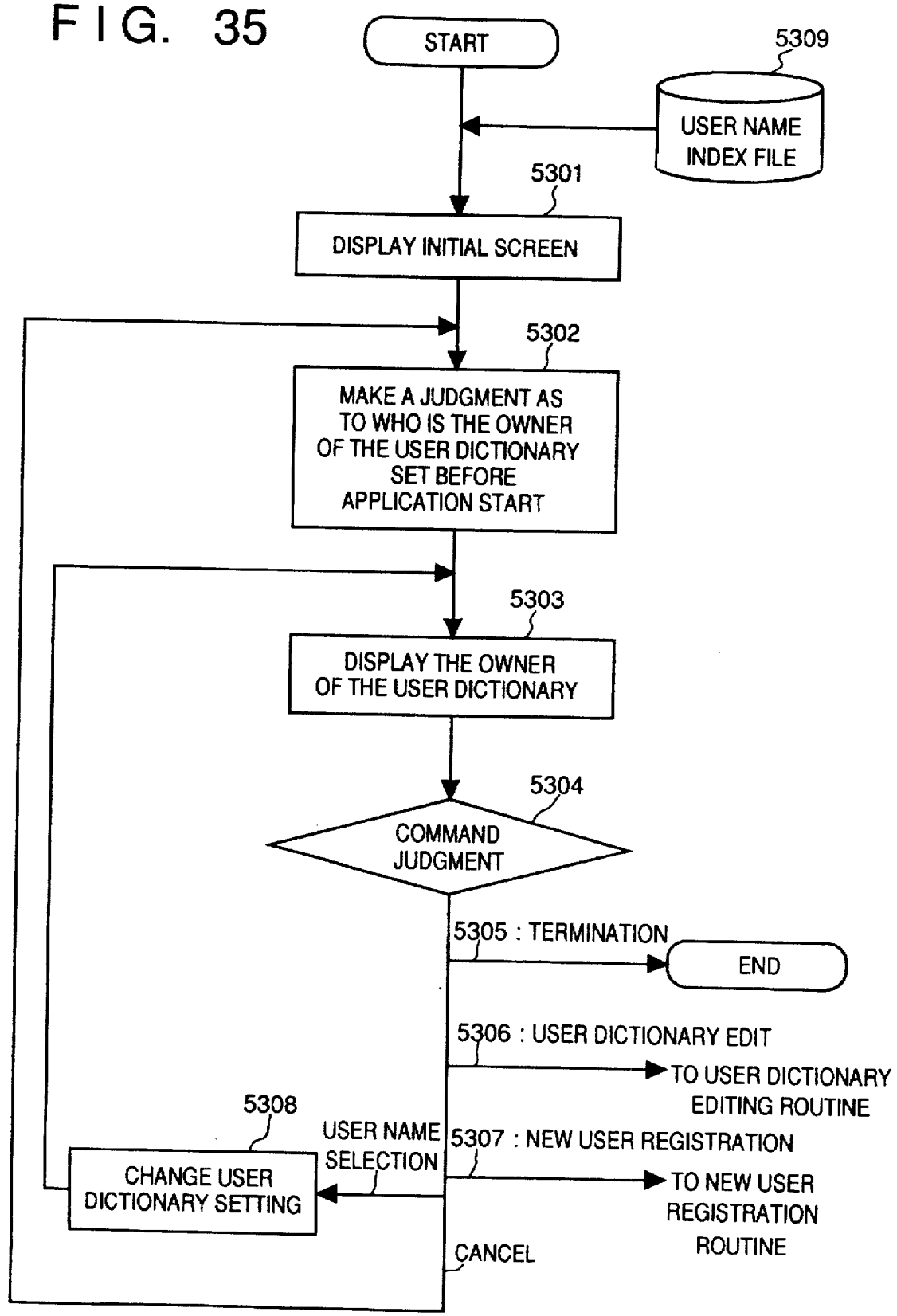
FIG. 35 is a flowchart showing an initial screen section.
Figure 58:
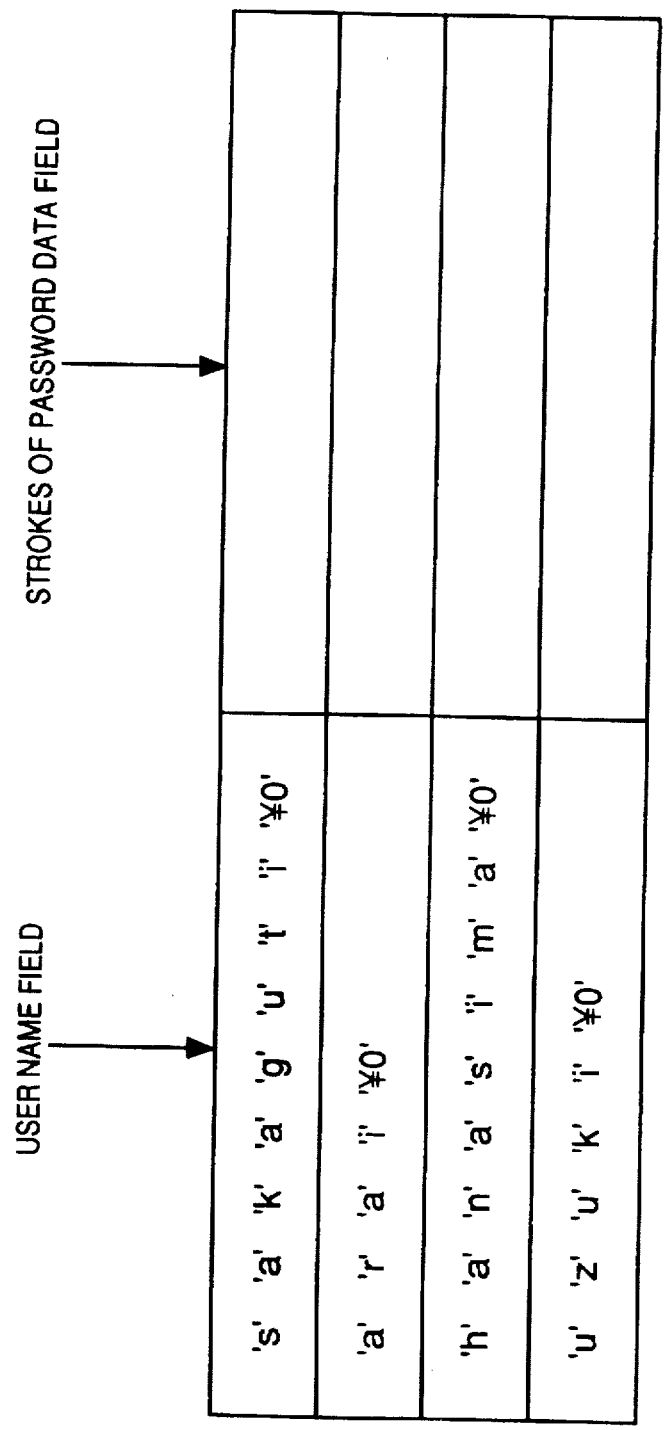
FIG. 58 is a diagram showing a structure of a user name index file.

In FIG. 35, when the user character pattern registration application program is started, a window is formed in step 5301. Then, the registered user names are read from the user name index file 5309 and written into the window. This user name index file 5309 is a disk file having a structure such as that shown in FIG. 58, wherein information can be read from and written into this file. The window is formed in such a fashion as shown in FIG. 50. In step 5302, the owner of the user dictionary registered in the system is determined. In step 5303, the owner name of the user dictionary displayed in the user name display area 6801 is marked. In the case of FIG. 50, the user having the user name "arai" is the owner. At this point, the process waits for a command to be given by the user (step 5304).

If a user name is selected directly via a pointing device such as a pen, a request for switching the owner of the user dictionary is issued, and the corresponding setting is performed in step 5308. If a button is selected, the operation is performed depending on the selected button as described below. If the "user dictionary edit" button 6805 is selected, the section for inputting and judging a password is called via the branch 306. If the "new user registration" button 6804 is selected, the new user registration section is called via the branch 307. In the case where the "cancel" button 6806 is selected, the setting with respect to the user dictionary associated with the current user name is canceled and the setting with respect to the user dictionary is restored to the original state in which the user dictionary was when the application program was started. On the other hand, if the "termination" button 6807 is selected, then the user character pattern registration application program is completed and the control returns to the system via the branch 305.

New User Registration Screen

Figure 36:
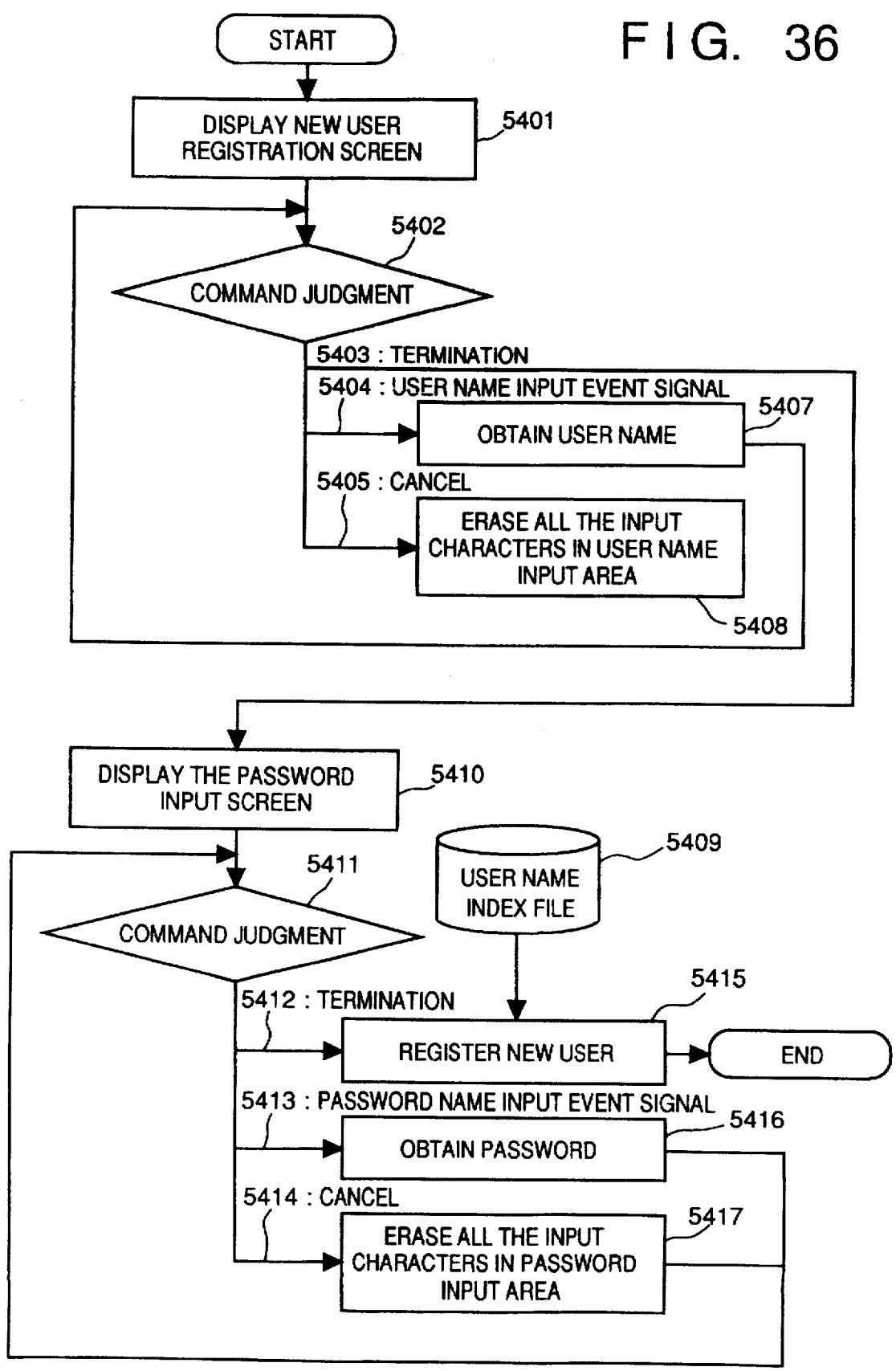
FIG. 36 is a flowchart showing a new user registration screen section.
Figure 51:
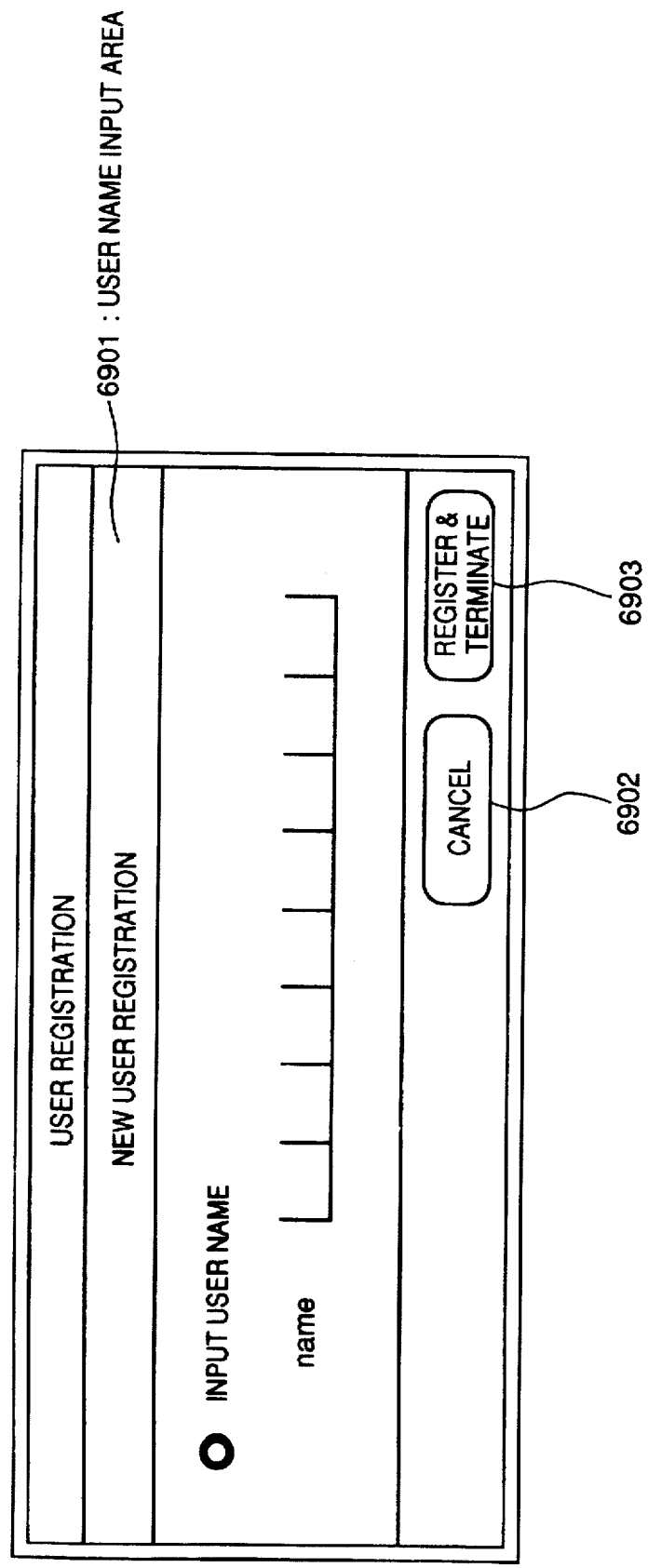
FIG. 51 is a diagram showing a new user registration screen.

Referring to FIG. 51 as well as the flowchart shown in FIG. 36, the process flow associated with the new user registration screen will be described below.

In FIG. 51, reference numeral 6901 denotes a user name input area for inputting a user name, reference numeral 6902 denotes a functional button for canceling the input of a user name, and reference numeral 6903 denotes a functional button for terminating from this window and displaying a password setting screen.

In the initial screen (FIG. 51), if the "new user registration" command 6804 is selected, a pop-up window such as that shown in FIG. 51 is displayed (step 5401). Then, the process waits for a further command to be given by the user (step 5402). If a pen-down operation is performed in the user name input area 6901 and thus if the resultant event signal is detected, then the existing character recognition section is called via the branch 5404. In this character recognition section, a handwritten character pattern written in the user name input area is recognized on line, and the character data is converted into a character code (step 5407).

Figure 52:
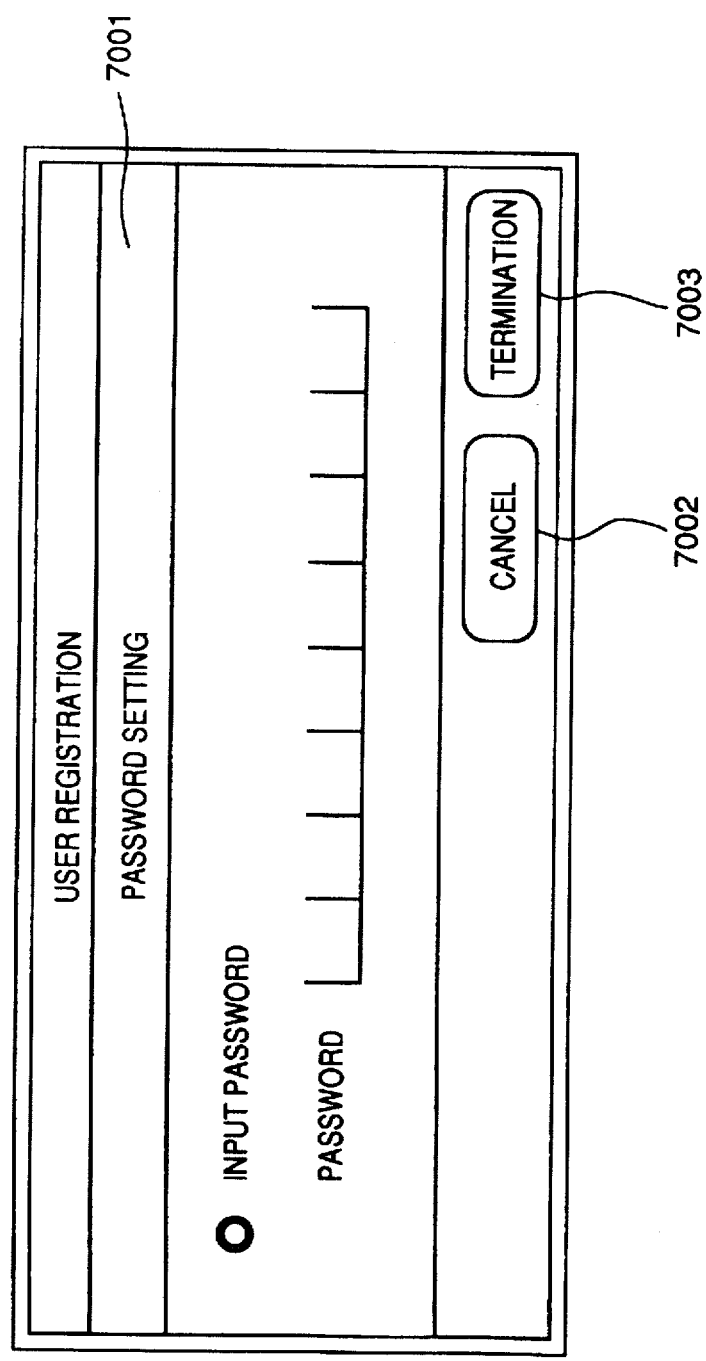
FIG. 52 is a diagram showing a password input judgment section.

If the "registration" button command 6903 is selected, a password setting window is displayed as shown in FIG. 52 (step 5410), and the process waits for a further command to be given by the user. If a pen-down operation is performed in the password input area 7001 and thus if the resultant event signal is detected, then the existing character recognition section is called via the branch 5413. In this character recognition section, a handwritten character pattern written in the user name input area is recognized on line, and characteristic features are extracted. On the other hand, if the "cancel" button command 7002 is selected, all characters input in the password input area are deleted (step 5417), and then the process waits for another password input command to be given by the user (step 5411).

If the "termination" button command 7003 is selected, a user name that has been input and converted via the user name input area is regarded as a new user name and added to the user name index file 5409 (step 5415). Then, the window is closed and the control returns to the initial screen section. On the other hand, if the "cancel" button command 6902 is selected, all characters input in the user name input area are deleted (step 408), and then the process waits for another user name input command.

Password Input and Judgment Section

Figure 37:
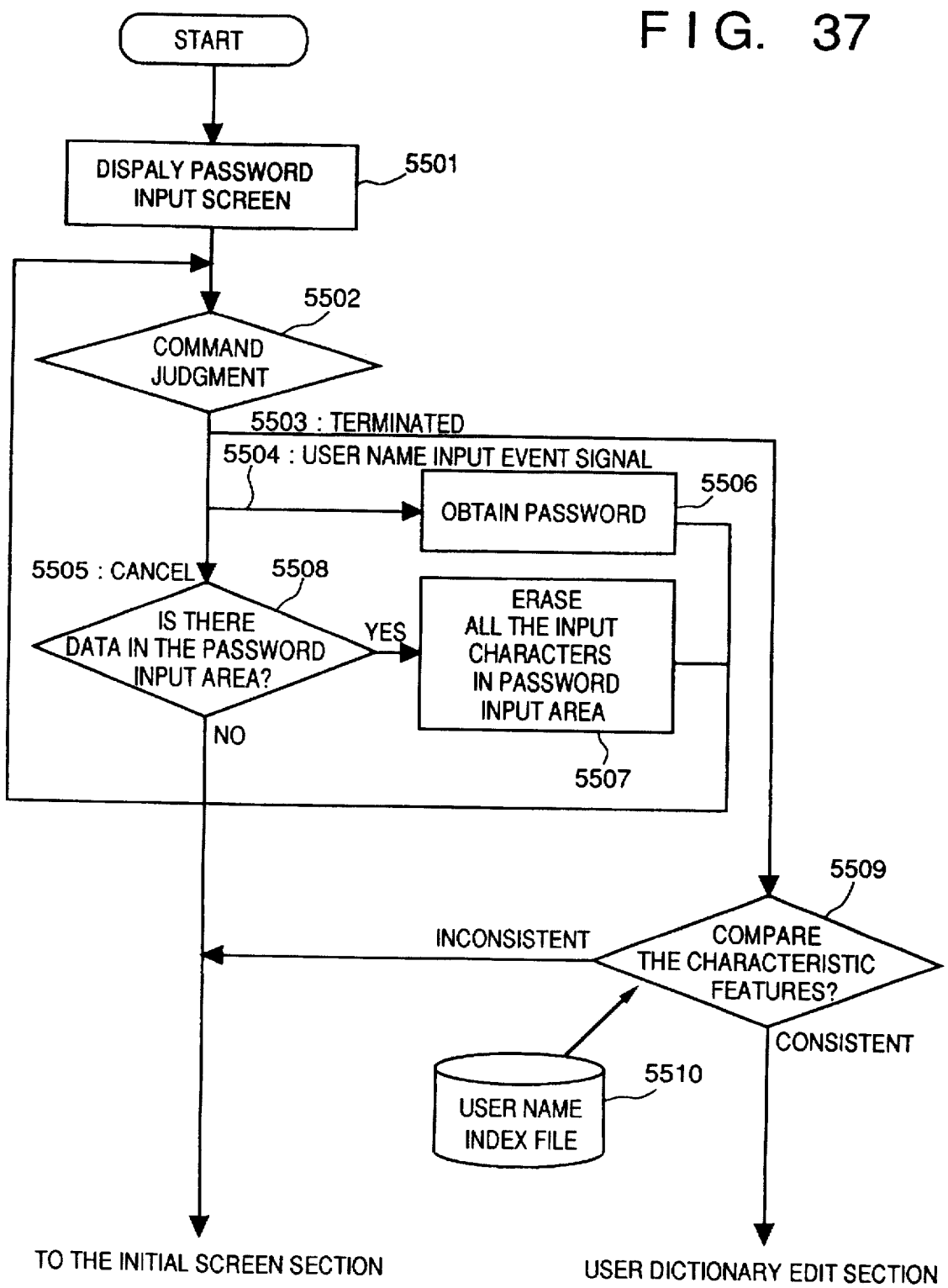
FIG. 37 is a flowchart showing a password input judgment section.
Figure 53:
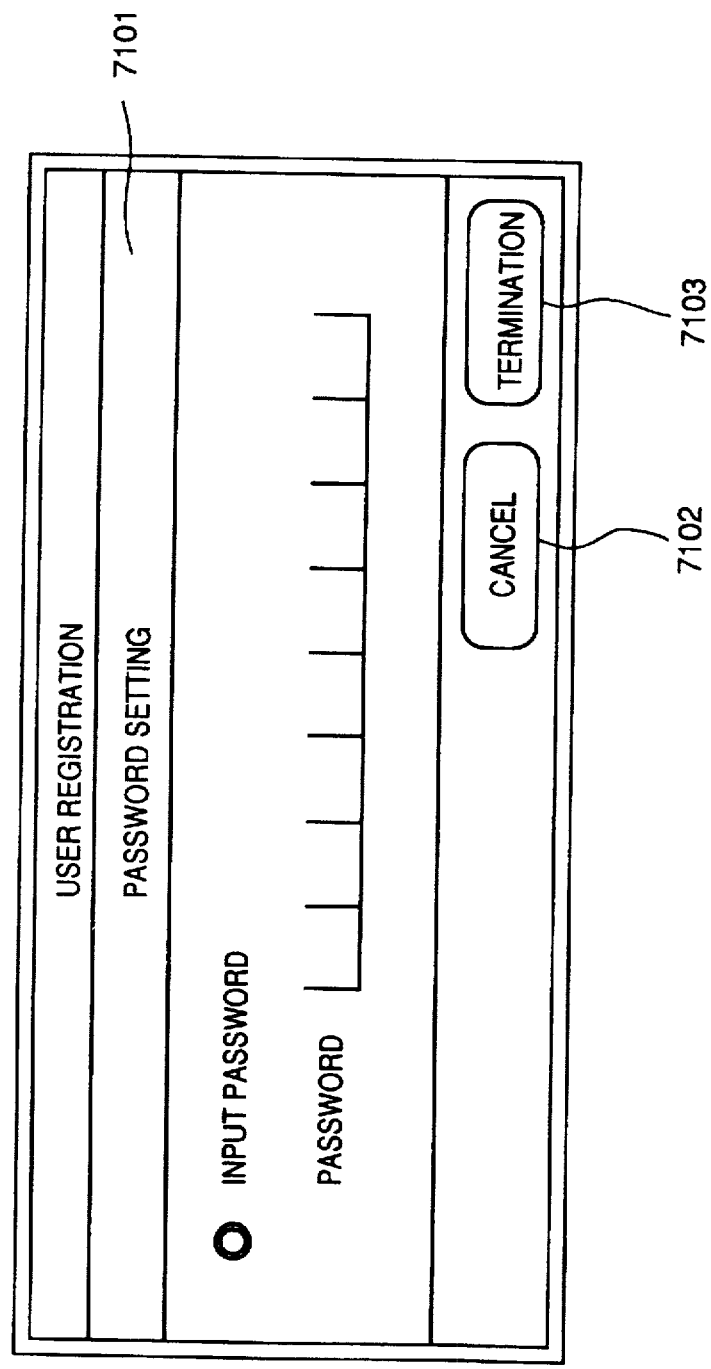
FIG. 53 is a diagram showing a screen for inputting a password for obtaining permission of editing a user dictionary.

Referring to FIG. 53 and the flowchart shown in FIG. 37, the process flows associated with the password input and judgment section will be described.

In FIG. 53, reference numeral 7101 denotes a password input area for inputting a password, reference numeral 7102 denotes a functional button for canceling the input of a password, and reference numeral 7103 denotes a functional button for terminating from this window after the completion of the judgment of a given password.

In the initial screen (FIG. 50), if the "user dictionary edit" command 6805 is selected, then a pop-up window such as that shown in FIG. 53 is displayed (step 5501) and the process waits for a further command to be given by the user. If a pen-down operation is performed in the password input area 7101 and thus if the resultant event signal is detected, then the existing character recognition section is called via the branch 504. In this character recognition section, a handwritten character pattern written in the password input area is recognized on line, and characteristic features are extracted (step 5507). After inputting the password in the password input area, if the "cancel" button command 7102 is selected, then all characters input in the password input area are deleted (step 505) and the process waits for another password input command to be given by the user.

When no password has been input yet in the password input area if the "cancel" button command 7102 shown in FIG. 53 is selected, then the password input window is closed and the control returns to the initial screen. On the other hand, if the "termination" button command 7103 is selected, the characteristic features obtained in step 5507 are compared with the characteristic features stored in the user name index file corresponding to the password of the designated user. If the degree of the difference is less than a threshold value, then the user dictionary editing section is called. If the characteristic features are not consistent, then the character string displayed in the password input area is deleted and the process waits for a further command to be given by the user.

User Dictionary Editing Section

Figure 38:
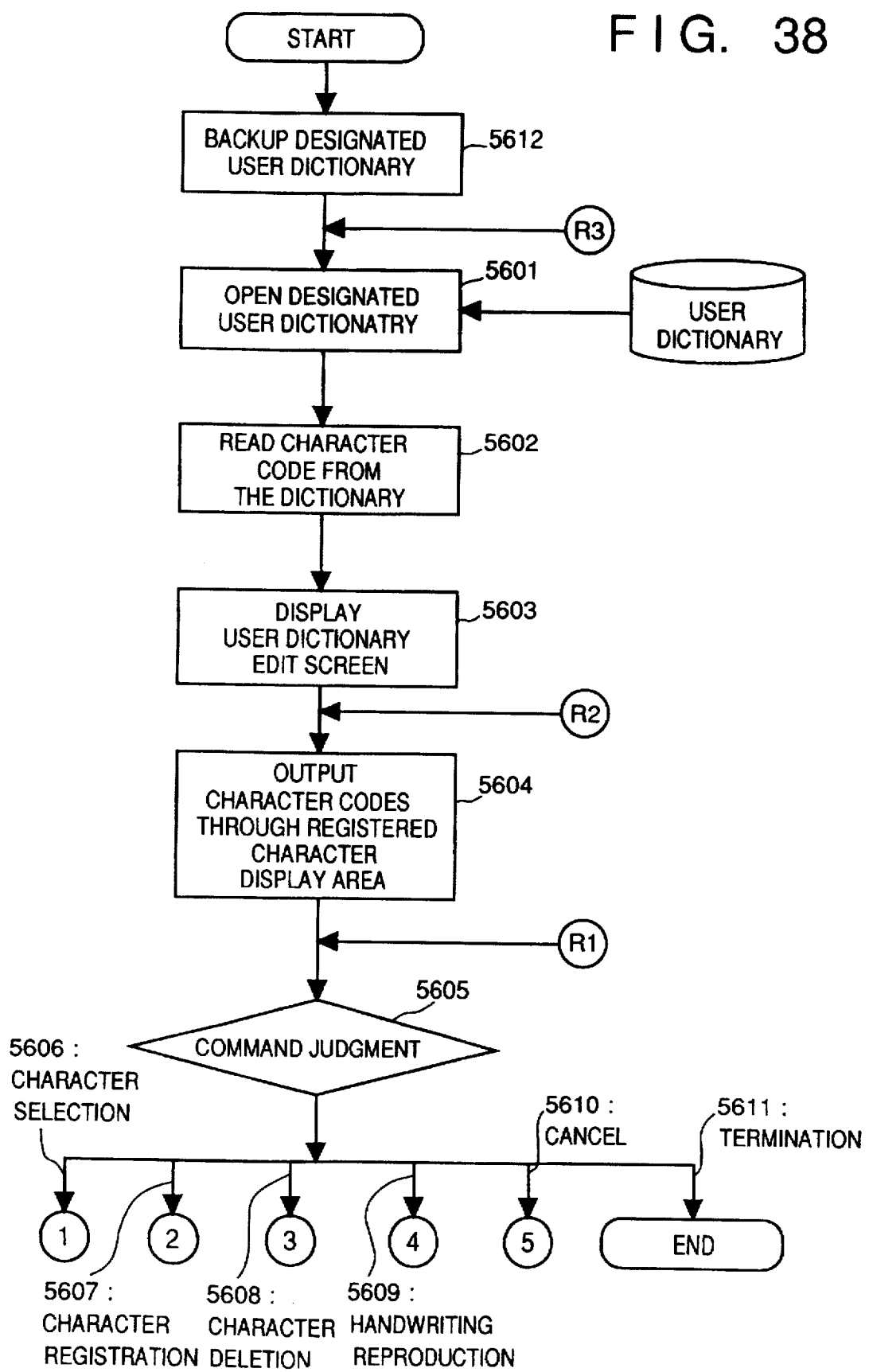
FIG. 38 is a flowchart showing a user dictionary editing section.
Figure 39:
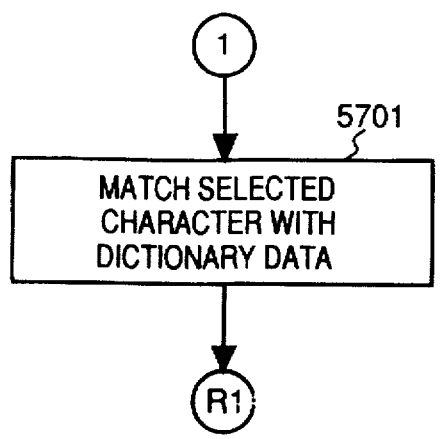
FIG. 39 is a flowchart showing a user dictionary editing section.

Now, the process flow in the user dictionary editing section will be described referring to FIG. 56 and the flowchart shown in FIG. 38.

Figure 56:
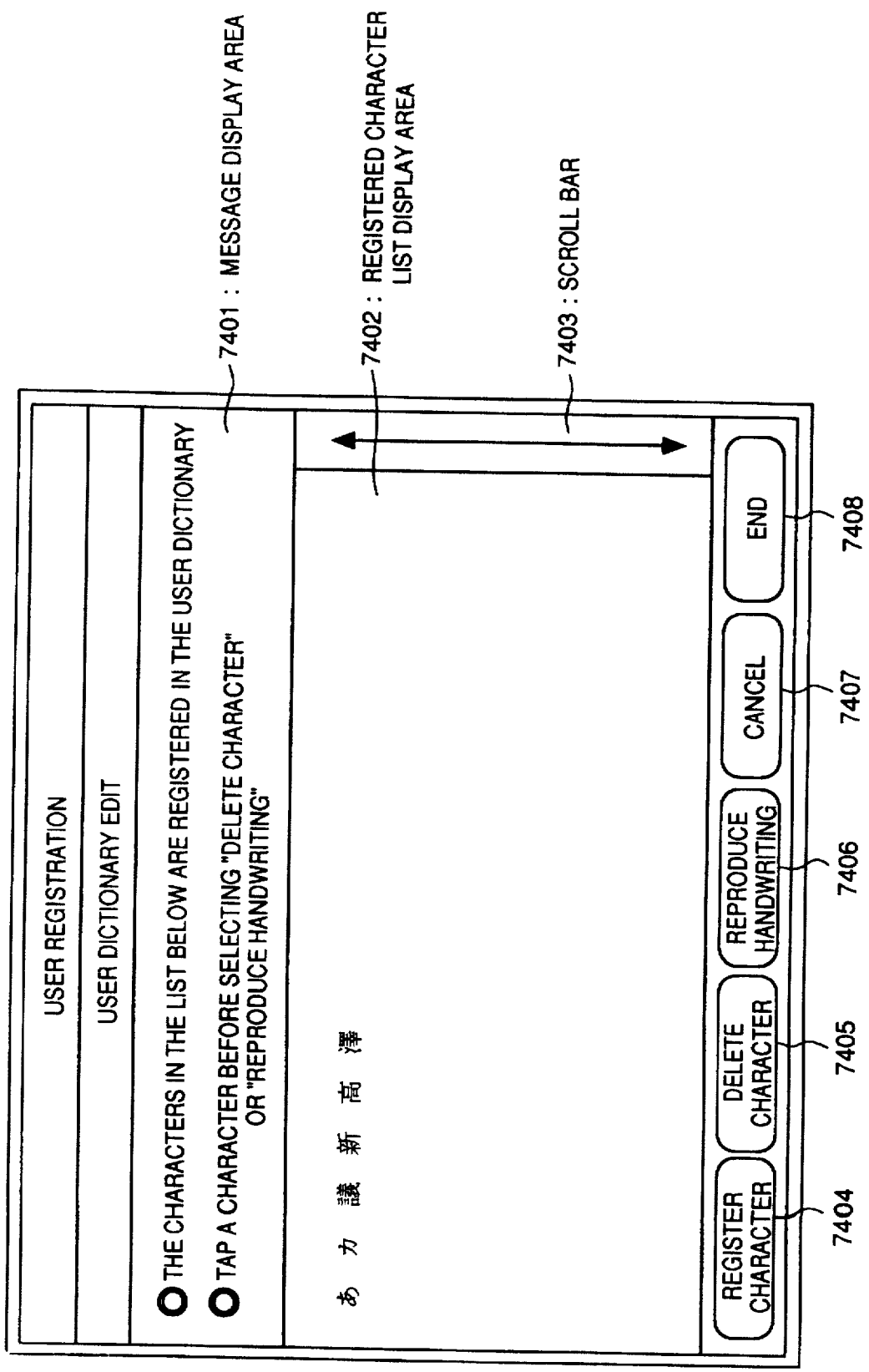
FIG. 56 is a diagram showing a user dictionary editing screen.

In FIG. 56, reference numeral 7401 denotes a message display area, reference numeral 7402 denotes an area for displaying a list of registered characters, reference numeral 7403 denotes a scroll bar that enables a large number of registered characters to be displayed, and reference numerals 7404-7408 denotes buttons for calling functions via a pen selection.

In the initial screen (FIG. 50), if the "user dictionary edit" 6805 is selected, and if it has been judged in the section for inputting and judging the password that the user gave a consistent password, a designated user dictionary is copied and the duplication is stored at a proper location (step 5612). This is done because the backup copy is required when it is desired to cancel the editing of the dictionary. The user dictionary is then opened, and character codes stored in the user dictionary are read into a buffer area (step 5602). A character code correspondence table is then created so that there is a one-to-one correspondence between the characters stored in the user dictionary and the characters to be displayed (step 5701 in FIG. 39).

FIG. 59 illustrates an example of a character code table for the case where six characters are registered. When a character is edited using the "delete" or "reproduction" command, if the dictionary includes a plurality of character data corresponding to the same character code and if such a character code correspondence table is not prepared, it is impossible to correctly retrieve unique character data from the dictionary. According to the character code correspondence table, the user dictionary edit screen is displayed as shown in FIG. 59 (step 5603).

Thus character codes are read and displayed in the registered character list display area 7402 (step 5604). Then the operation process waits for a further command to be given by the user (step 5605). If a pen-down operation is performed in the registered character list area and thus if the resultant signal is detected, then the character designated by the pen-down operation is selected (branch 5606). From the information of the position at which the selected character is located, the display number in the character code correspondence table is determined. Furthermore, from this display number, the location in the user dictionary at which the dictionary character data is stored actually is determined, and thus dictionary character data to be edited is obtained.

Figure 40:
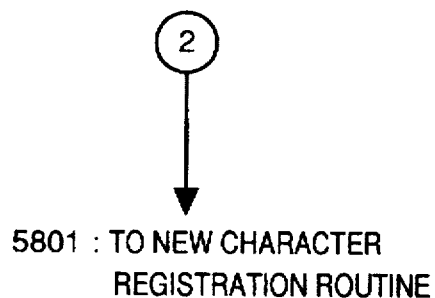
FIG. 40 is a flowchart showing a user dictionary editing section.
Figure 41:
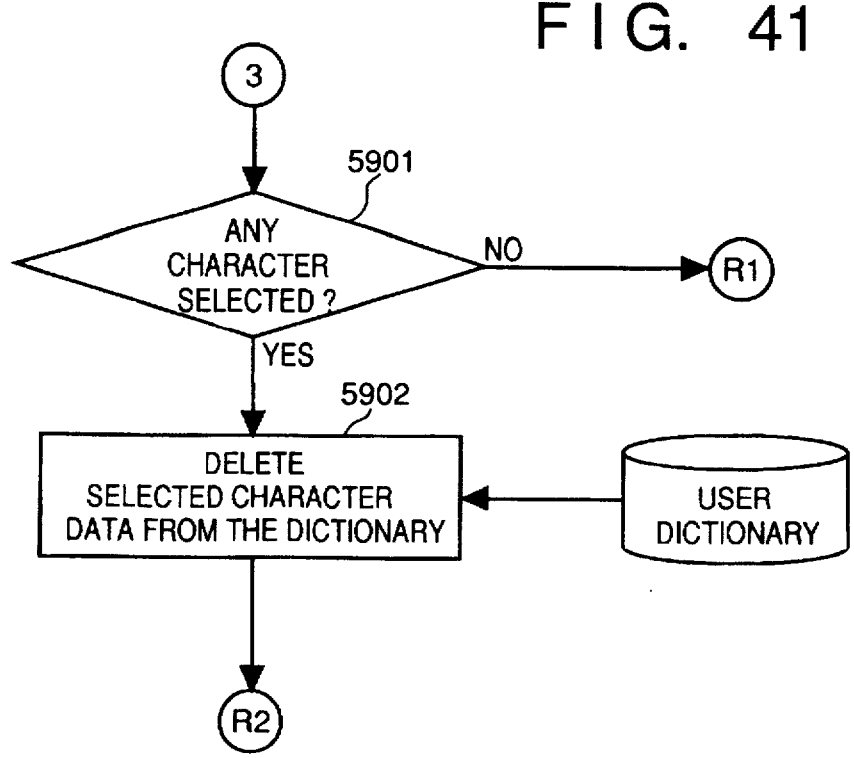
FIG. 41 is a flowchart showing a user dictionary editing section.
Figure 42:
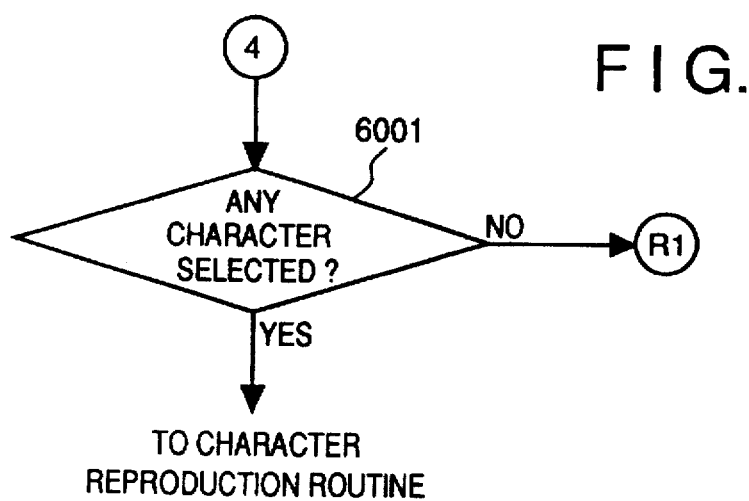
FIG. 42 is a flowchart showing a user dictionary editing section.
Figure 43:
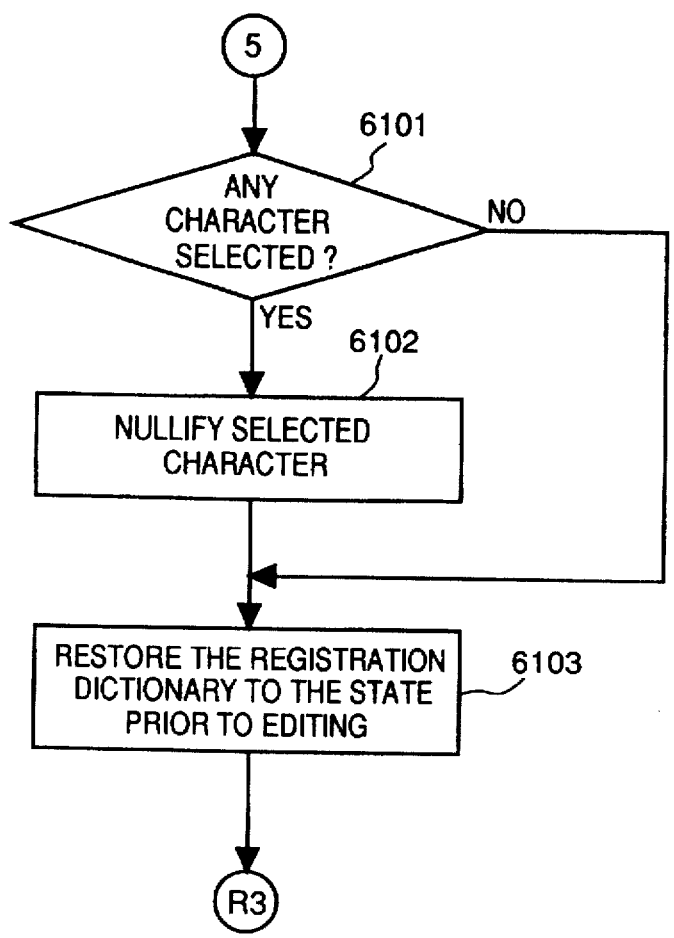
FIG. 43 is a flowchart showing a user dictionary editing section.

If the register character" button command 7404 is selected (branch 5607), the new character registration section is called (branch 5801 in FIG. 40). If the "delete character" button command 7405 is selected (branch 5608), it is judged whether some character in the registered character list area is selected (step 5901 in FIG. 41). If no character is selected, the operation process waits for a further command in step 5605. If some character is selected, then the location in the dictionary at which the data of the character to be deleted is stored is searched referring to the above-described character code correspondence table. When the location is found, the character data is removed from the user dictionary (step 5902). When the contents of the user dictionary are modified, the character code correspondence table is also modified and the characters displayed in the registered character list area are updated (step 5604).

In the case where the "reproduce handwriting" button 7406 is selected (branch 5609), if some character is selected, then the handwritten character reproduction section is called. If no character is selected, then the process waits for a character to be selected (step 6001 in FIG. 42). On the other hand, if the "cancel" button command 7407 is selected (branch 5610), it is checked whether some character in the registered character list area is selected (step 6101 in FIG. 43). If some character is selected, the selection of the character is canceled and the display on the screen is also changed such that no character is selected (step 6102). Then, the contents in the relating dictionary are restored to the original state in which the dictionary was when the dictionary edit window was opened (step 6103) so that another editing operation can be performed. In the case where the "end" button command 7408 is selected, the user-dictionary edit window is closed and the control returns to the starting window.

New Character Registration Section

Figure 44:
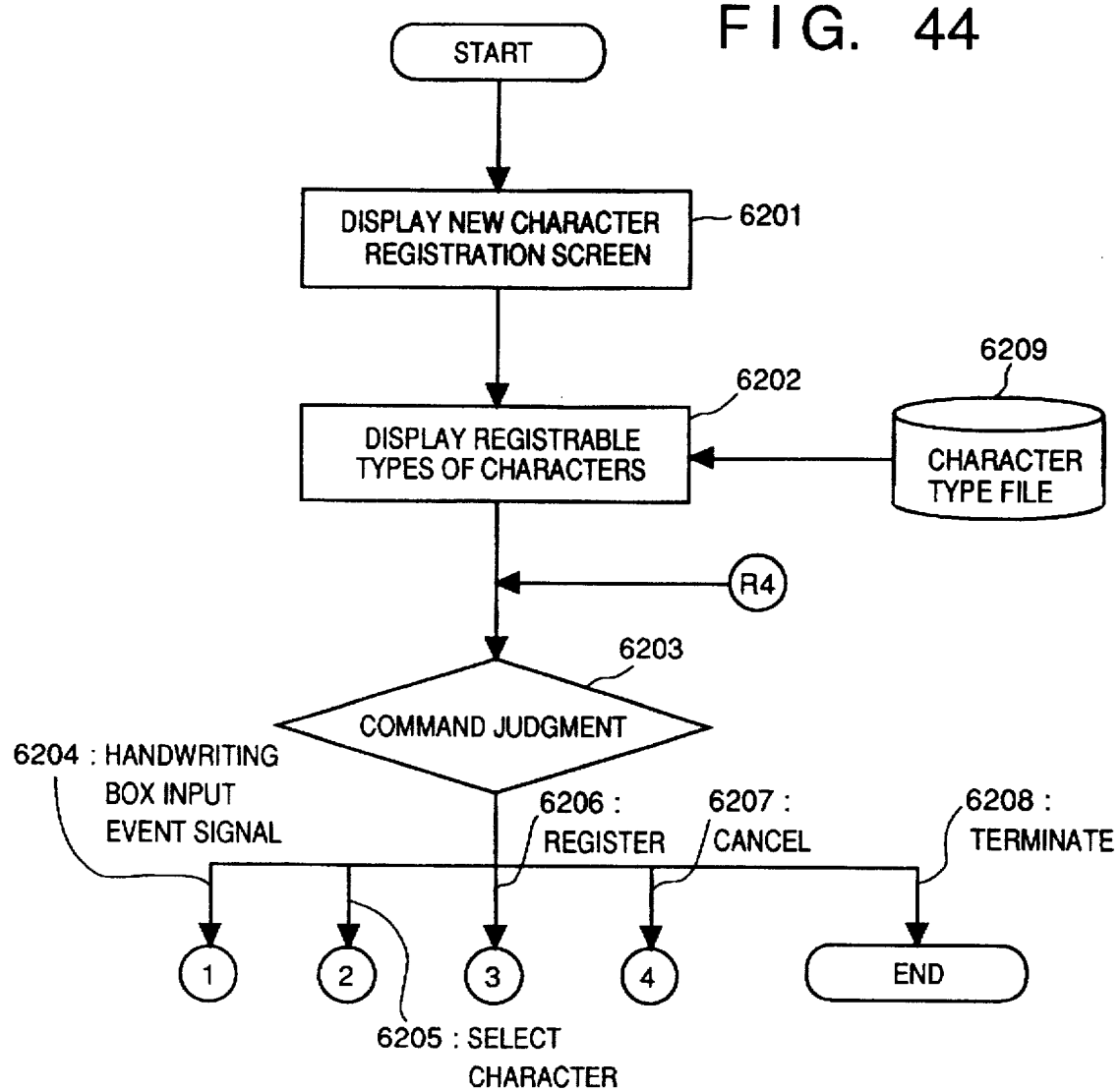
FIG. 44 is a flowchart showing a new character registration section.
Figure 45:
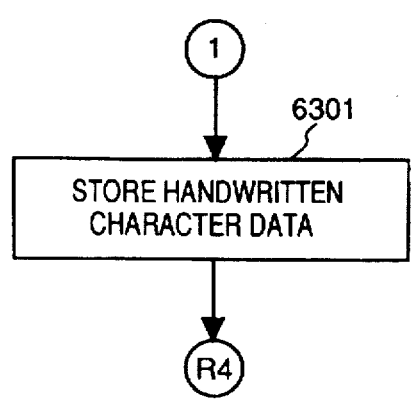
FIG. 45 is a flowchart showing a new character registration section.
Figure 46:
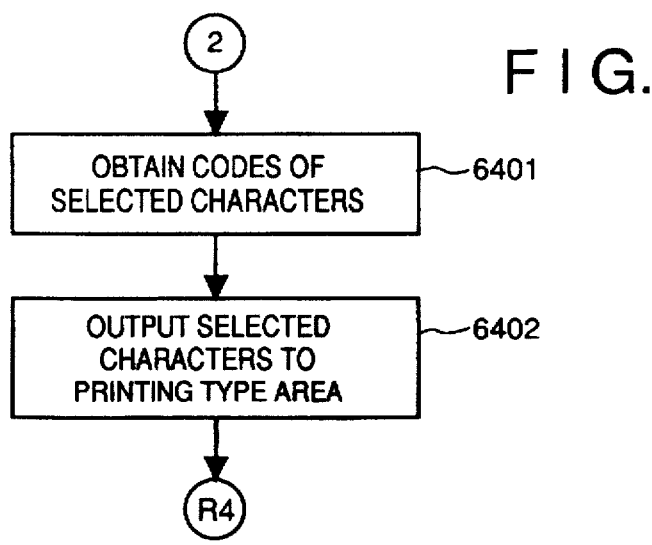
FIG. 46 is a flowchart showing a new character registration section.
Figure 54:
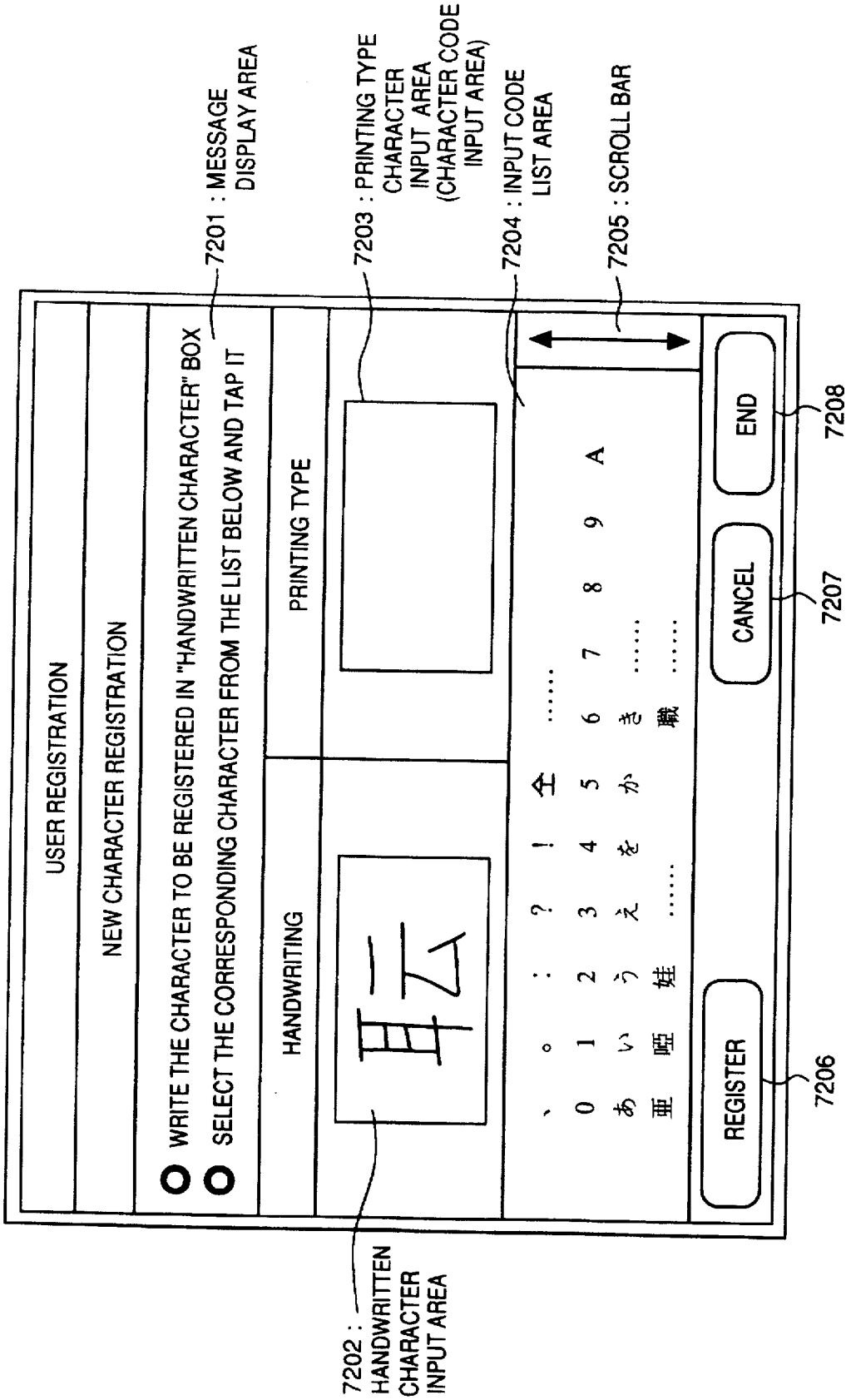
FIG. 54 is a diagram showing a new character registration screen.
Figure 55:
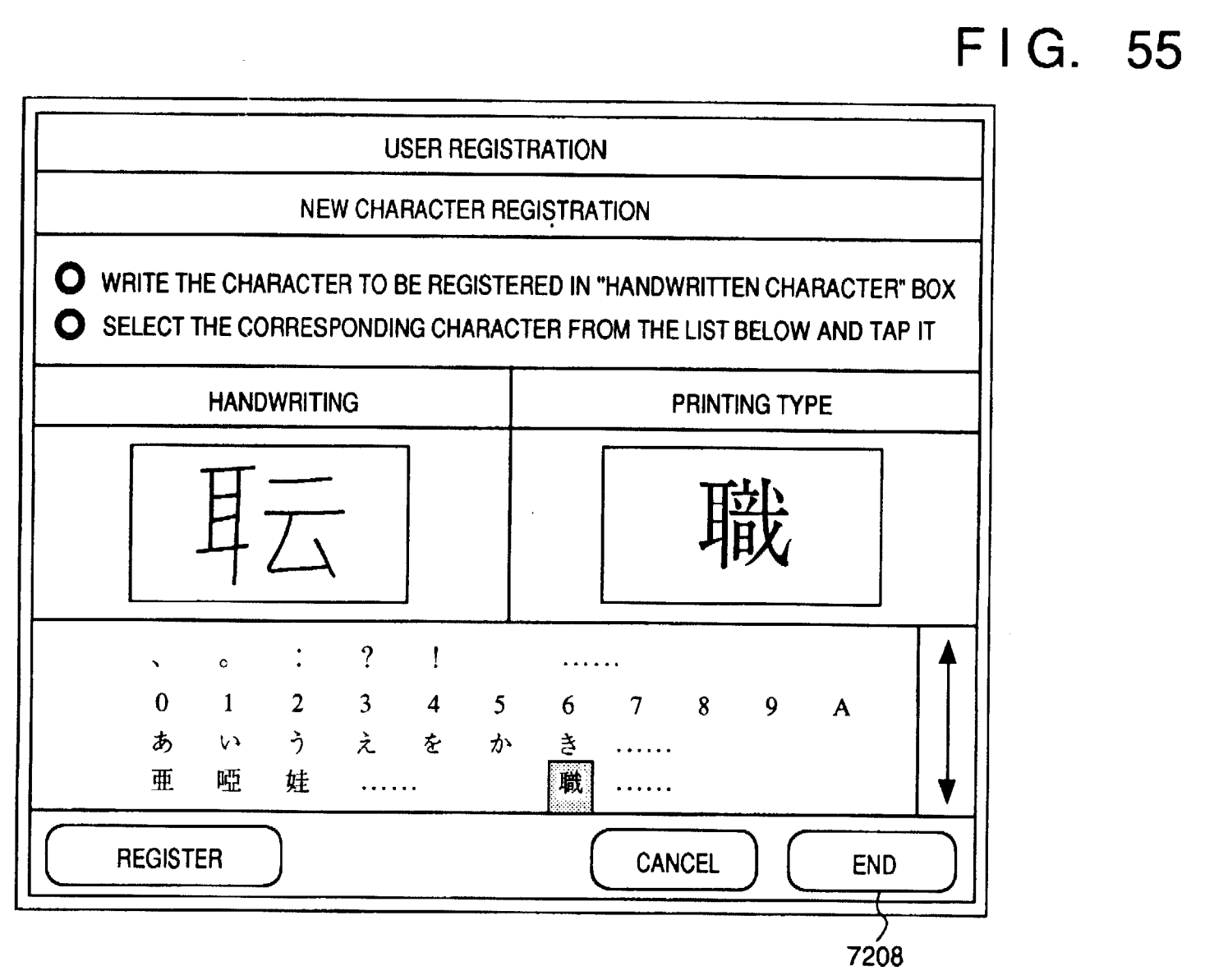

Referring to FIGS. 54 and 55 as well as the flowchart shown in FIG. 44, the process flow in the new character registration section will be described below.

In FIG. 54, reference numeral 7201 denotes a message display area, reference numeral 7202 denotes a handwritten character input area, reference numeral 7203 denotes a printing type character input area, reference numeral 7204 denotes an input code list area, reference numeral 7505 denotes a scroll bar that enables a plurality of characters to be displayed, and reference numerals 7206–7208 denote buttons for calling functions via pen selection.

In the user dictionary editing screen, if the "character registration" 7404 is selected, a pop-up window having a frame such as that shown in FIG. 54 is displayed (step 6201). Here in this invention, the term "character registration" is used to refer to the operation of assigning character data of a specific handwritten character given by a user to a corresponding character code. To accomplish the character registration, it is required that there is provided a data input area for acquiring character data of a handwritten character pattern given by a user as well as a character code input area for inputting the corresponding character code. In FIG. 54, the "handwritten character" area 7202 serves as the handwritten character data input area, and "printing character" area 7203 serves as the character code input area. In the area 7204 at the lower and center of FIG. 54, there is shown a list of input codes, that facilitates inputting of character codes. A character code can be input by selecting the corresponding character from this list. It is required that all possible characters to be registered can be displayed in the input code list area. This can be achieved by creating a character file 1209 containing all possible characters to be registered.

Thus, characters that can be registered are read from this file and indicated in the input code list area (step 6202). When the indication of the possible characters is complete, the operation process waits for a further command to be given by the user (step 6203). If a pen-down signal given by the user via the "handwritten character" area is detected, the handwritten character data in the form of a set of two-dimensional coordinates is stored in the buffer area (branch 6204 in FIG. 44), and also displayed in the "handwritten character" area 7202. In FIG. 54, there is shown a character in the abbreviated form of 职 (a kanji or Japanese character "shoku" meaning a job) that has been just written by the user.

As described above, the corresponding character code is input by selecting a character from the list of input character codes. The character code corresponding to the selected character is stored in the buffer area temporarily via branch 6205, and then the character code is acquired (step 6401 in FIG. 46). Each time a character is selected, the selected character is displayed in an enlarged fashion in the printing type character area (step 6402).

Figure 47:
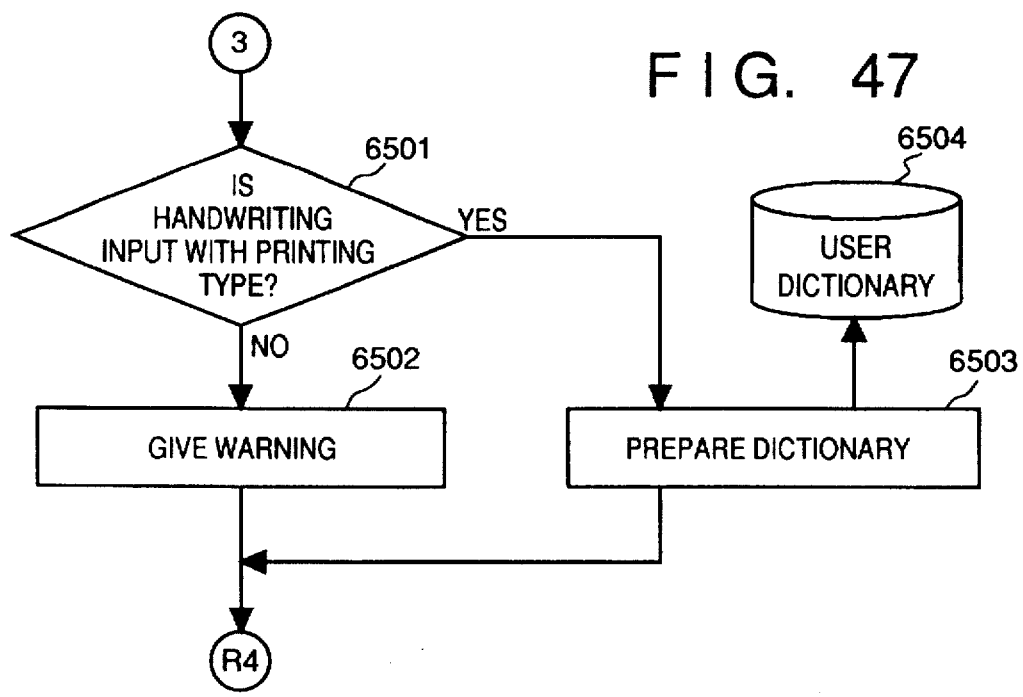
FIG. 47 is a flowchart showing a new character registration section.
Figure 48:
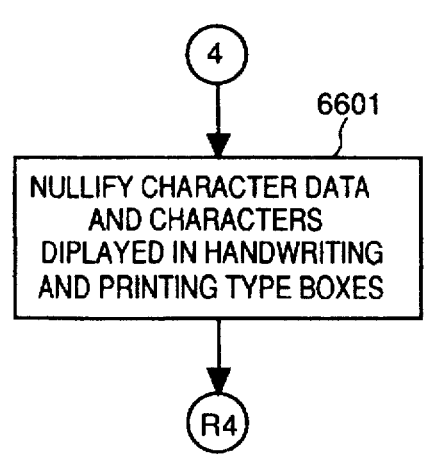
FIG. 48 is a flowchart showing a new character registration section.

If the "registration" button command 7206 is selected, then branch 6206 is selected and it is checked whether a handwritten character has been input in the "handwritten character" area 7202 and the corresponding character has also been input in the printing type character area 7203 (step 6501 in FIG. 47). If yes, then a recognition dictionary associated with the character is created (step 6503). This recognition dictionary can be created by generating a standard pattern from the character data according to a known technique. As a result, the standard pattern is stored in a new or existing user dictionary 6504. If the handwritten character data or the character code is input incorrectly, a warning is indicated (step 6502) and the process is repeated so that both handwritten character data and character code corresponding to the character to be registered are input correctly.

In the case where "cancel" button command 7202 is selected, branch 6207 is selected and the character data and the character code input in the "handwritten character" area and the "printing type character" area, respectively, are canceled (step 6601 in FIG. 48) so that another data can be input. In FIG. 55, there is shown a character 职 ("shoku") that has been just selected from the list of character codes. In this state, if the "end" button command 7208 is selected, the new character registration window is closed and the process control returns to the user dictionary editing screen.

Handwritten Character Reproduction Section

Figure 49:
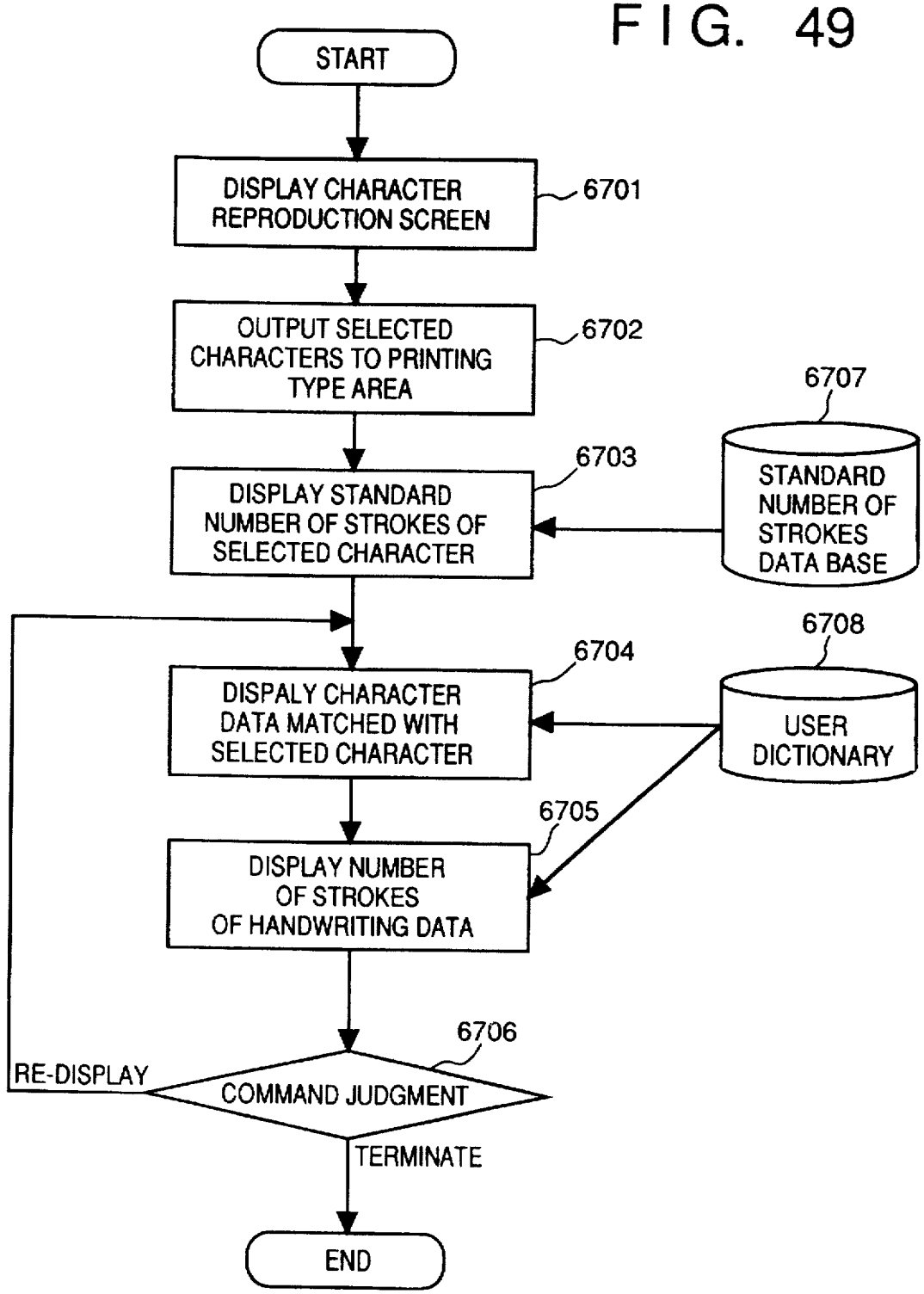
FIG. 49 is a flowchart showing a handwritten character reproducing section.

Now, the process flow in the handwritten character reproduction section will be described referring to FIG. 57 as well as the flowchart shown in FIG. 49.

Figure 57:
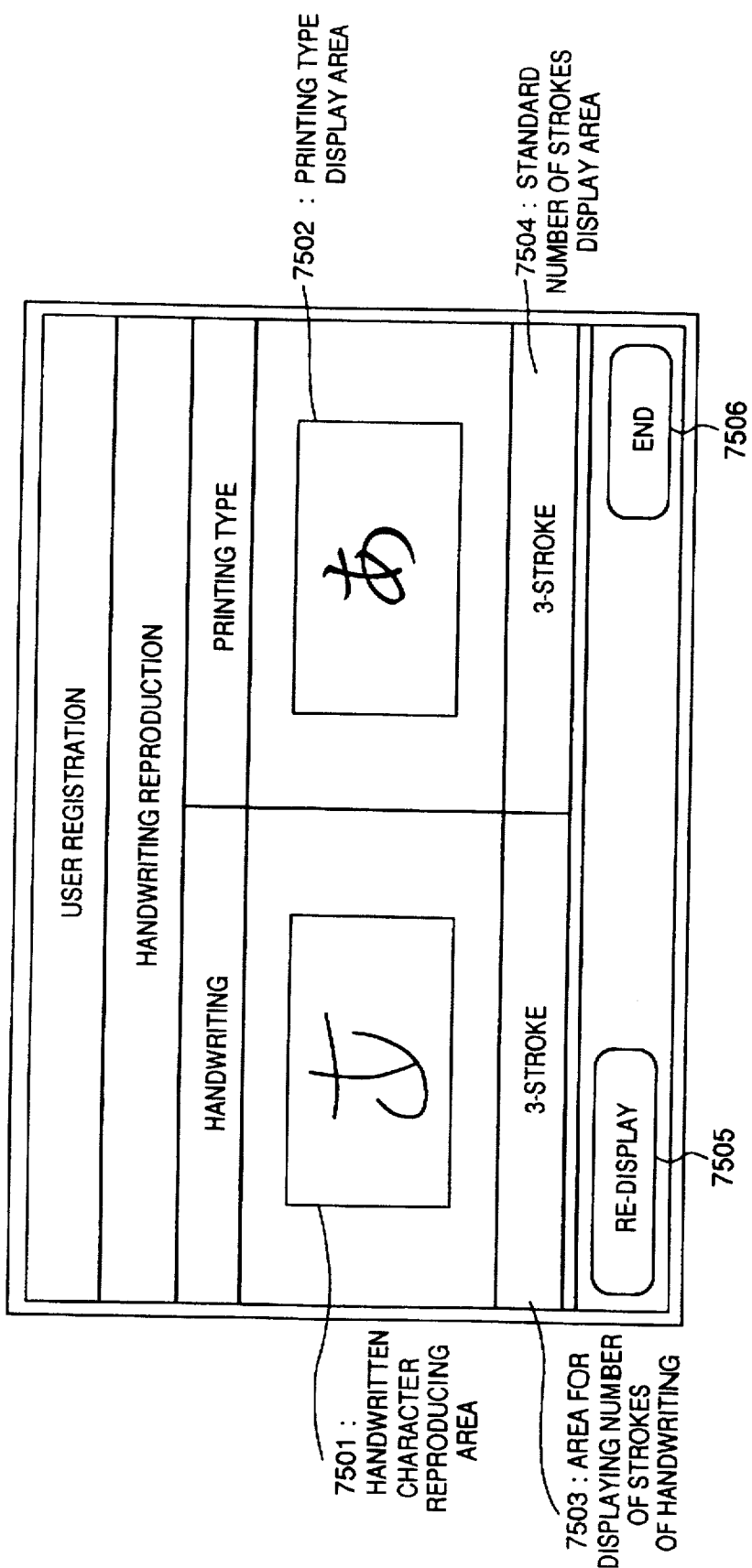
FIG. 57 is a diagram showing a handwriting reproduction screen.

In FIG. 57, reference numeral 7501 denotes a handwritten character reproducing area, reference numeral 7502 denotes a printing type display area in which a printing type character corresponding to a handwritten character is displayed, reference numeral 7503 denotes an area for displaying the number of writing strokes of a handwriting, reference numeral 7504 denotes an area for displaying the number of writing strokes of the printing type character, and reference numerals 7505 and 7506 denotes buttons for calling functions via a pen selection.

If "reproduce handwriting" 7406 is selected in the user dictionary editing screen (FIG. 56), a screen frame is produced and shown in a pop-up window fashion as shown in FIG. 57 (step 6701). Furthermore, a character code that has been selected in the user dictionary editing screen is displayed in an enlarged font in the printing character display area (step 6702). In addition to the character in the enlarged font, the number of writing strokes of the character is also displayed (step 6703), which is performed by retrieving it from a database 6707 of standard character stroke numbers in which the standard character stroke number of each character is stored.

To reproduce character data stored in the user dictionary, it is required to correctly extract data that corresponds uniquely to a selected character. This can be performed using the above-described character code correspondence table. The dictionary data corresponding to a character includes coordinate points together with information representing a pen-down or pen-up operation. Therefore, it is possible to determine which stroke each coordinate point belongs to. Thus, coordinate points included in the same stroke are linked by a line from point to point thereby drawing a character pattern (step 6704).

In this drawing process, the number of pen-down operations is counted, and the resultant number is displayed as the number of writing strokes of the handwritten character (step 6705). In step 6706, if it is judged that the "re-display" command 7505 has been selected, then the reproduction drawing data is deleted and the handwritten character is drawn again using the data stored in the dictionary. In the case where the "end" command 7506 is selected, the handwritten character reproduction window is closed, and the process control returns to the user dictionary editing screen. FIG. 57 shows the middle of a drawing process of drawing a selected character あ (hiragana "a").

In the above-described embodiment, the formation of windows and the detection of various signals can be performed using a known technique. Furthermore, a pen is used as the pointing device in the embodiment described above, a mouse can also be used for selecting and writing operations.

In the second embodiment described above, characteristic features of handwritten characters pattern input by a user are extracted, and compared with the characteristic features of the handwritten characters that were registered as the password in the new user registration operation thereby judging whether the user should be allowed to edit the user dictionary. Alternatively, the judgment of whether a user should be allowed to edit a user dictionary may also be performed on the basis of, in addition to the characteristic features, a time period required to extract the characteristic features, that is measured when a user dictionary edit operation begins and a password in the new user registration operation is registered.

This alternative embodiment will be described in more detail referring to the accompanying drawings as well as the second embodiment described above. First, a user registration section will be described (FIG. 36). In the initial screen (FIG. 50), if the "new user registration" command 6804 is selected, a pop-up window such as that shown in FIG. 51 is displayed (step 5401 in FIG. 36) and the process waits for a further command to be given by the user (step 5402). If a pen-down operation is performed in the user name input area 6901 and thus if the resultant event signal is detected, then the existing character recognition section is called via the branch 5404. In this character recognition section, a handwritten character pattern written in the user name input area is recognized on line, and the character data is converted into a character code (step 5407).

If the "registration" button command 6903 is selected, a password setting window is displayed as shown in FIG. 52 (step 5410), and the process waits for a further command to be given by the user. If a pen-down operation is performed in the password input area 7001 and thus if the resultant event signal is detected, then the existing character recognition section is called via the branch 5413. In this character recognition section, a handwritten character pattern written in the user name input area is recognized on line, and characteristic features are extracted (step 5416). In this step, the characteristic features are extracted from time to time and the time at which each feature is extracted is measured and stored.

The process flow in the section of inputting and judging a password according to this alternative embodiment will be described referring to FIG. 53 and the flowchart shown in FIG. 37.

In the initial screen (FIG. 50), if the "user dictionary edit" command 6805 is selected, then a pop-up window such as that shown in FIG. 53 is displayed (step 5501) and the process waits for a further command to be given by the user. If a pen-down operation is performed in the password input area 7101 and thus if the resultant event signal is detected, then the existing character recognition section is called via the branch 504. In this character recognition section, a handwritten character pattern written in the password input area is recognized on line, and characteristic features are extracted (step 5507). In this step, the characteristic features are extracted from time to time and the time at which each feature is extracted is measured.

If the "termination" button command 7103 is then selected, the characteristic features obtained in step 5507 are compared with the characteristic features stored in the user name index file corresponding to the password of the designated user. Furthermore, the time at which each characteristic feature is extracted is also compared with that stored in the file. If the degree of the difference in the characteristic features is less than a threshold value, and if the degree of the difference in the extraction time is also less than a threshold value, then the user dictionary editing section is called. If the degree of the difference is greater than the threshold value, then the character string displayed in the password input area is deleted and the process waits for a further command to be given by the user.

The present invention can be applied not only to a system including only one piece of equipment but also to a system including a plural pieces of equipment. The present invention can also be applied to a system or apparatus in which the functions are realized using a program supplied from the outside.

Although the present invention and its advantages have been described in detail referring to specific embodiments, it should be understood that various modifications, substitutions and alterations can be made without departing from the spirit and scope of the invention as defined by the appended claims.

What is claimed is:

1. A character recognition apparatus that inputs a character pattern and recognizes the character pattern, said character recognition apparatus comprising:

input means for inputting a character pattern to be registered into a dictionary;

warning issuing means for recognizing the input character pattern, for automatically judging whether or not the input character pattern is a suitable pattern to be registered into the dictionary based on a recognition result of the input character pattern and reliability of the recognition result, and for automatically issuing a warning corresponding to the input character pattern in a case that the input character pattern is not a suitable pattern to be registered into the dictionary;

indicating means for indicating whether or not the input character pattern corresponding to the warning should be registered in the dictionary;

registration means for registering the input character pattern together with information indicating that the input character pattern has been registered in spite of the warning in a case that said indicating means indicates that the input character pattern should be registered in the dictionary.

2. A character recognition apparatus according to claim 1, wherein the reliability of the recognition result is estimated according to information including information of a handwritten character pattern.

3. A character recognition apparatus according to claim 1, further comprising display means for displaying characters in such a manner that it is possible to distinguish a character with high recognition reliability from a character with low recognition reliability by means of at least one of reverse techniques, color difference, shade difference, display density difference, and outline difference.

4. A character recognition apparatus according to claim 1, further comprising display means for displaying characters in such a manner that characters with low recognition reliability are displayed in a display area different from a display area in which characters with high recognition reliability are displayed.

5. A character recognition apparatus according to claim 1, further comprising display means for displaying a character pattern registered in the dictionary in such a manner that is possible to distinguish whether or not the displayed character pattern has caused recognition reliability of the dictionary to decrease.

6. A character recognition apparatus according to claim 1, further comprising:

handwritten character pattern registration means for registering information of handwritten character patterns peculiar to a specific user inputted via said input means;

access allowing means for determining whether or not the user is allowed to access the dictionary based on the information of the input handwritten character pattern peculiar to the specific user; and dictionary edit means for editing the dictionary allowed to be accessed.

7. A method of registering a character pattern in a user dictionary in a character recognition apparatus for inputting a character pattern and recognizing the character pattern, said method comprising the steps of:

recognizing the input character pattern to be registered into a dictionary;

automatically judging whether or not the input character pattern is a suitable pattern to be registered into the dictionary based on a recognition result of the input character pattern and reliability of the recognition result;

automatically issuing a warning corresponding to the input character pattern in a case that the input character pattern is not a suitable pattern to be registered into the dictionary; and registering the input character pattern in the user dictionary together with information representing that the input character pattern has been registered in spite of the warning in a case that it is requested that the input character pattern corresponding to the warning be registered in the dictionary.

8. A method according to claim 7, wherein the reliability of the recognition result is estimated according to information including information of a handwritten character pattern.

9. A computer-readable medium having computer-executable program steps for registering a character pattern in a user dictionary in a character recognition apparatus for inputting a character pattern and recognizing the character pattern, said computer-executable program steps including:

a recognizing step to recognize the input character pattern to be registered into a dictionary;

a judging step to automatically judge whether or not the input character pattern is a suitable pattern to be registered into the dictionary based on the recognition result of the input character pattern and reliability of the recognition result;

an issuing step to automatically issue a warning corresponding to the input character pattern in a case that the input character pattern is not a suitable pattern to be registered into the dictionary; and a registering step to register the input character pattern in the user dictionary together with information representing that the input character pattern has been registered in spite of the warning in a case that it is requested that the input character pattern corresponding to the warning be registered in the dictionary.

10. A computer-readable medium according to claim 9, wherein said computer-readable medium includes a dictionary means for registering the input character pattern together with information representing that the input character pattern has caused recognition reliability of the dictionary to decrease.

* * * * *